Sept. 1, 1970  W. S. BACHMAN  3,526,690
METHOD AND APPARATUS FOR PRODUCING PHONOGRAPH RECORDS
Original Filed Aug. 24, 1964  12 Sheets-Sheet 1
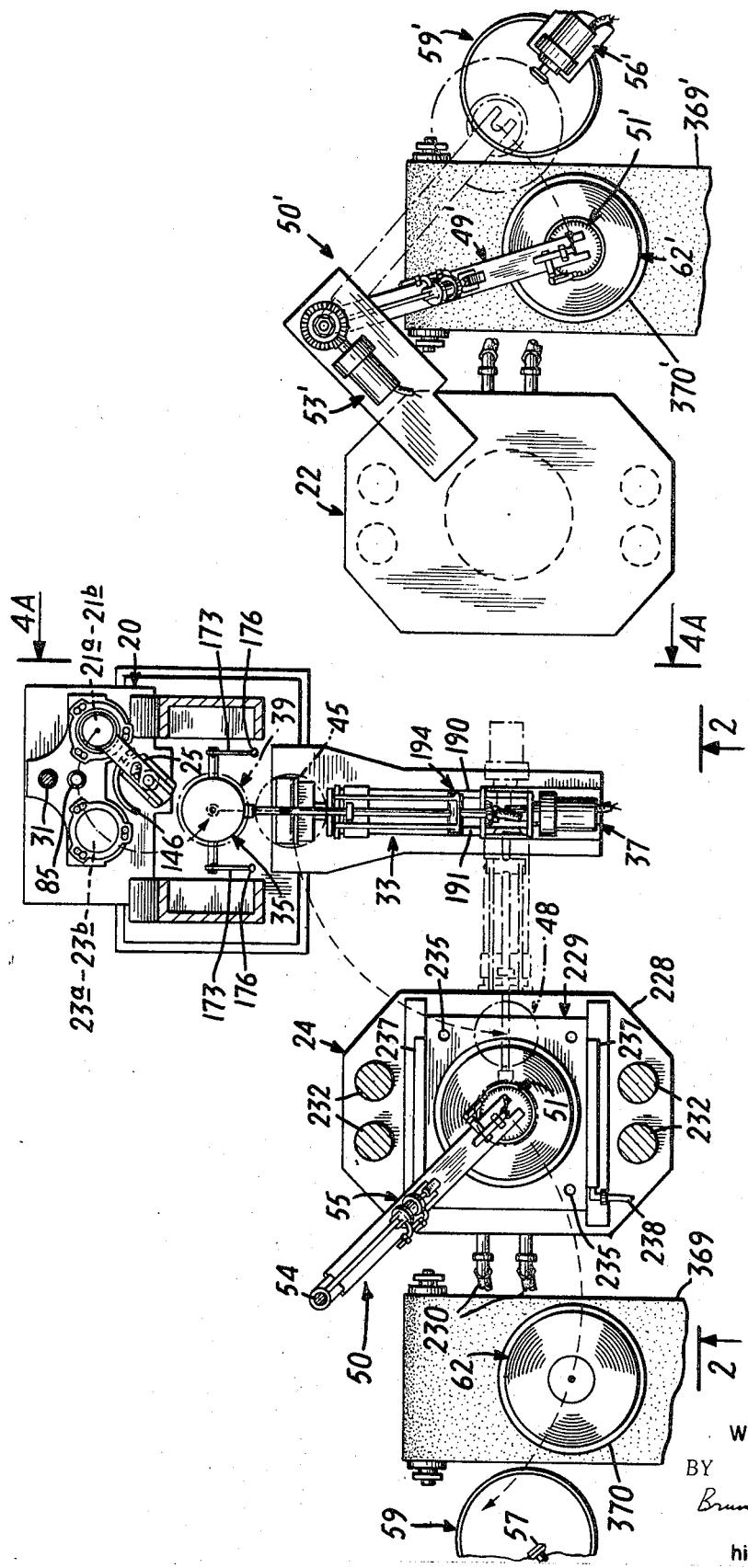
FIG. I
INVENTOR.
WILLIAM S. BACHMAN
BY
Brumbaugh, Free, Graves & Donohue
his  ATTORNEYS.

Sept. 1, 1970        W. S. BACHMAN        3,526,690
METHOD AND APPARATUS FOR PRODUCING PHONOGRAPH RECORDS
Original Filed Aug. 24, 1964        12 Sheets-Sheet 2
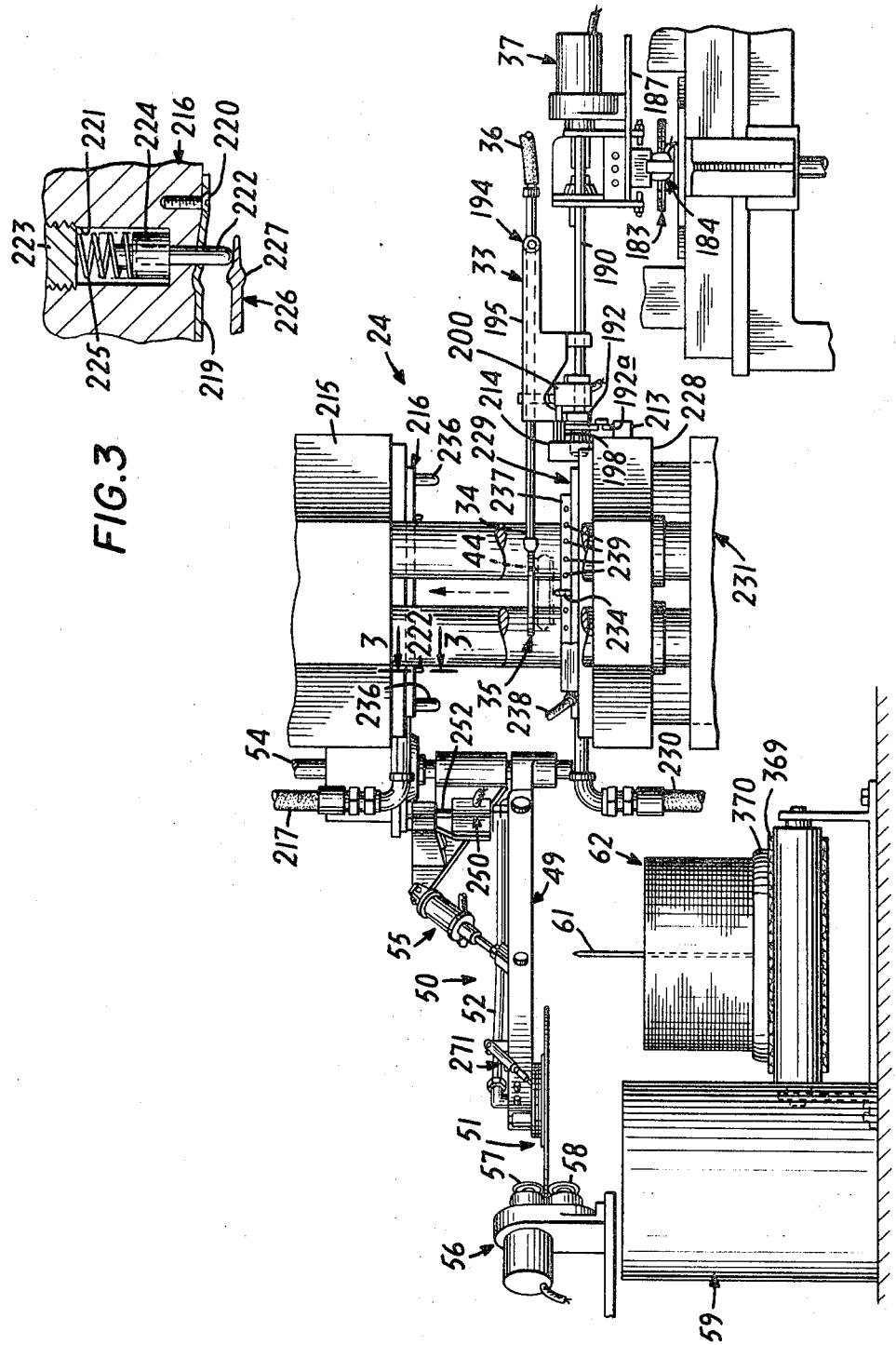
INVENTOR.
WILLIAM S. BACHMAN
BY
Brumbaugh, Free, Graves & Donohue
his    ATTORNEYS

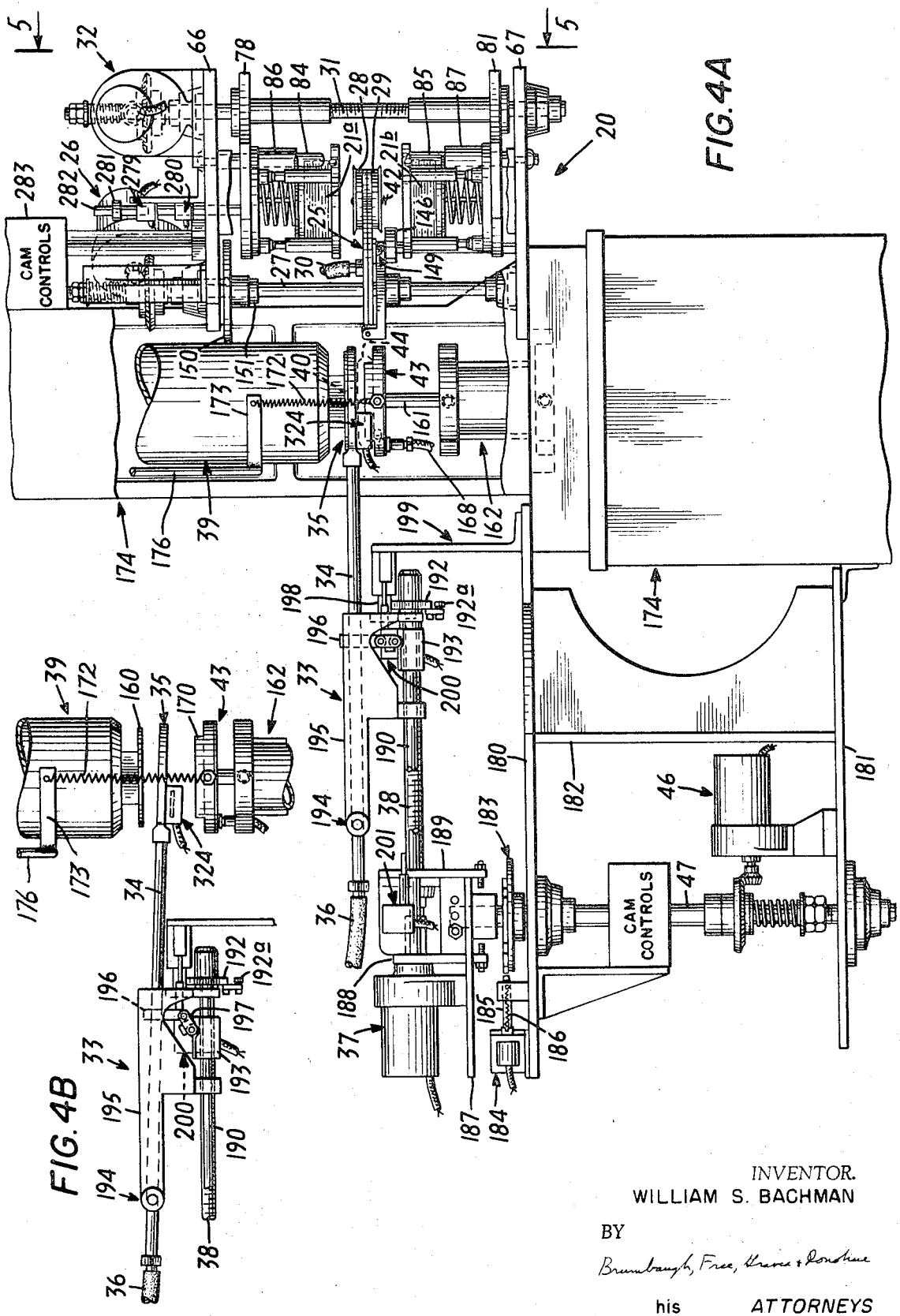

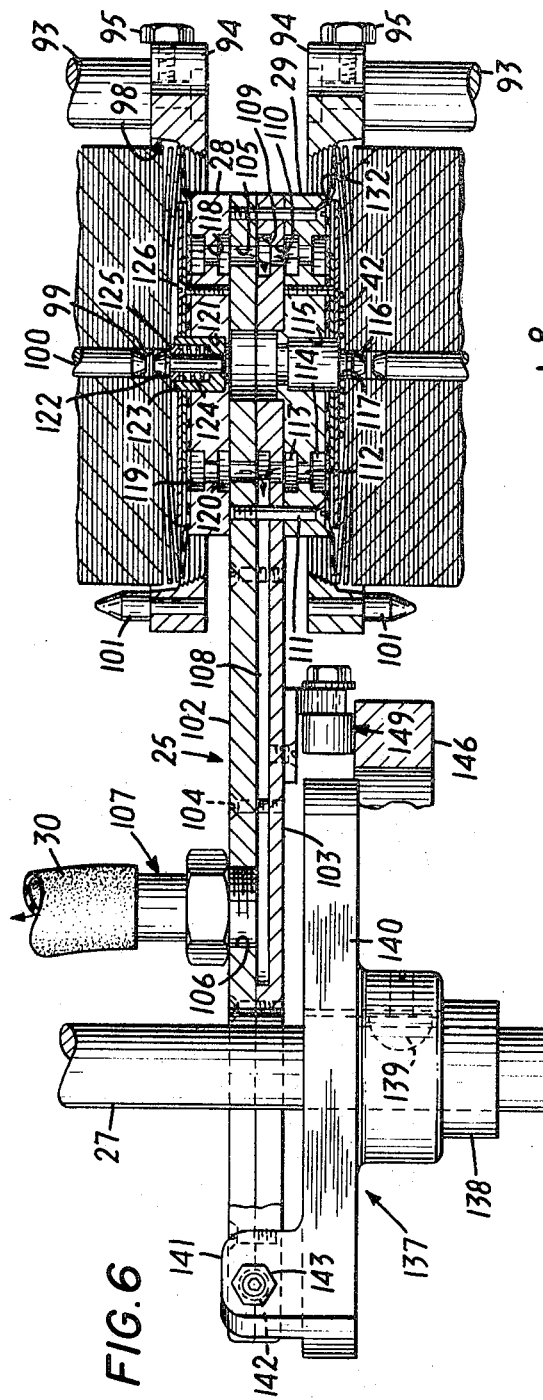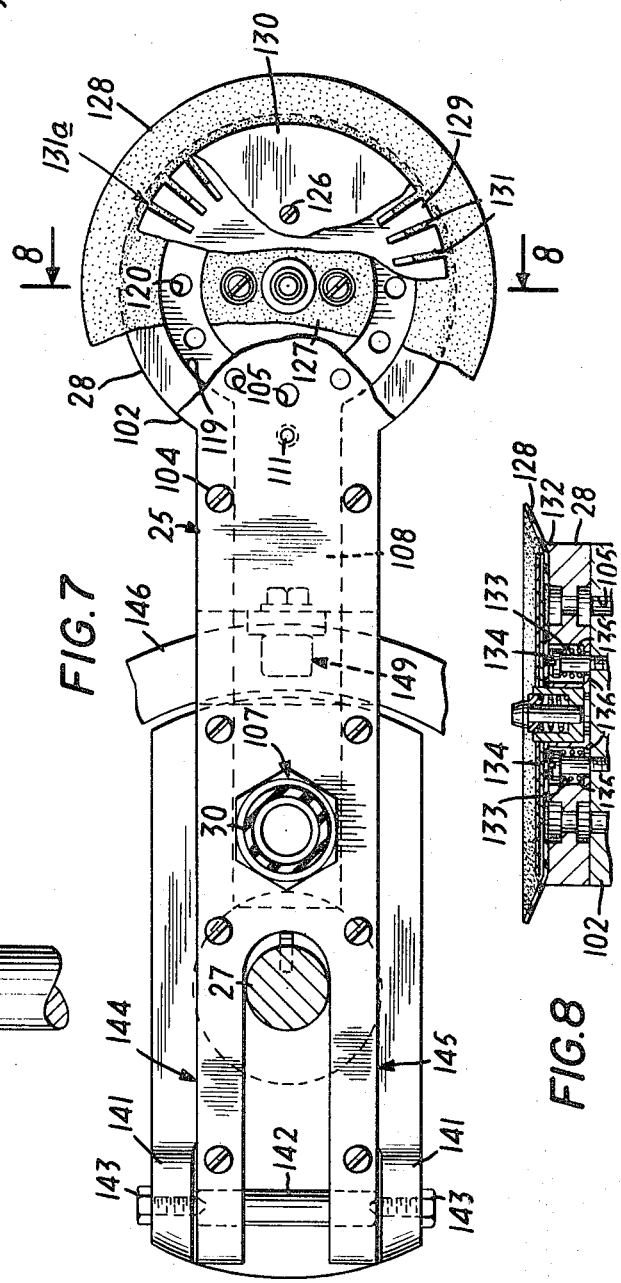

Sept. 1, 1970  W. S. BACHMAN  3,526,690
METHOD AND APPARATUS FOR PRODUCING PHONOGRAPH RECORDS
Original Filed Aug. 24, 1964  12 Sheets-Sheet 6

INVENTOR.
WILLIAM S. BACHMAN
BY
Brumbaugh, Free, Graves & Donohue
his ATTORNEYS.

Sept. 1, 1970           W. S. BACHMAN           3,526,690

METHOD AND APPARATUS FOR PRODUCING PHONOGRAPH RECORDS

Original Filed Aug. 24, 1964           12 Sheets-Sheet 10

INVENTOR.
WILLIAM S. BACHMAN
BY
Brumbaugh, Free, Graves & Donohue
his ATTORNEYS.

United States Patent Office
3,526,690
Patented Sept. 1, 1970

1

3,526,690
METHOD AND APPARATUS FOR PRODUCING PHONOGRAPH RECORDS
William S. Bachman, Southport, Conn., assignor to Columbia Broadcasting Systems, Inc., New York, N.Y., a corporation of New York
Continuation of application Ser. No. 391,603, Aug. 24, 1964. This application Feb. 17, 1969, Ser. No. 805,097
Int. Cl. B29d 17/00
U.S. Cl. 264—107    26 Claims

ABSTRACT OF THE DISCLOSURE

A system for producing phonograph records by extruding a charge of molding material between a pair of spaced-apart record labels, transferring the charge of molding material and the pair of labels to a record molding apparatus, and activating the molding apparatus to produce a photograph record having the pair of labels affixed to opposite sides thereof.

---

This is a continuation of application Ser. No. 391,603, filed Aug. 24, 1964, now abandoned.

This invention relates to a molding method and apparatus and, more particularly to a method and apparatus for producing photograph records or the like.

Phonograph records are conventionally produced in a molding press or die having two molds, one being fixed while the other may be reciprocated into and out of engagement with the first. Each mold is a heavy cored structure into which steam and water are introduced as required in the molding cycle. The engaging surfaces of the two molds are recessed or contoured to the approximate shape of the record, but the final shape and program information are determined by a thin metal matrix which covers the recess portion of the mold. A thermoplastic molding material is fed to the press from an extruder which preplasticizes the material (usually supplied in granular or powdered form). Often gas is trapped in the molding material during the extrusion process, causing imperfections in the finished phonograph record. After the thermoplastic material has been compressed between the two molds with the record labels in place, the record thus formed is extracted from the press, a step which often causes difficulty because of the tendency of the record to stick to one or both of the molds. Next the "flash" must be removed from the periphery of the record, the flash being the excess or scrap amount of molding material which is forced outside of the recessed portions of the molds. Finally, the finished records are stacked and packaged as necessary. The above steps in the production of photograph records are time-consuming and require considerable manpower.

Accordingly, it is an object of the present invention to overcome the above-mentioned difficulties of convention systems for producing phonograph records.

Another object of the invention is to provide a novel method and apparatus for automatically producing phonograph records.

A further object of the invention is to provide an improved apparatus for quickly and positively freeing a phonograph record from the molds of a press.

A still further object of the invention is to provide a novel method and apparatus for selectively picking a single label from a stack of labels.

Yet another object of the invention is to provide a novel and improved method and apparatus for automatically trimming the flash of a record.

These and other objects and advantages of the invention are obtained by a method including the following series of steps. The first step consists of feeding a pair of spaced-apart record labels to the extruder, which then extrudes a charge of molding material between the labels. In an exemplary embodiment, the nozzle of the extruder is vented during the extrusion of the molding material in order to prevent gas from being trapped therein. Next the package or biscuit comprising the charge of molding material between the two labels is transferred to the molding press, whereupon the press is activated to begin its molding cycle. As the cooperative molds of the press are separated, the phonograph record formed therein is freed from the molds, and the record is conveyed to a trimmer which removes the flash at the periphery of the record. Finally, the finished record is stacked so that a stack of the desired number of records may be transported to a packaging station.

The above sequence may be completed automatically, each step being initiated by a previous step. For example, at the appropriate time in the molding cycle, the label feeding apparatus is signaled to feed the next pair of labels to the extruder. In this way, the apparatus operates continuously to produce photograph records as long as the extruder and label feeding apparatus are supplied with molding material and labels, respectively. Furthermore, in the illustrative embodiment of the apparatus to be explained presently, two molding presses are operated automatically, each press being fed a pair of labels corresponding to the particular record being molded therein.

All of the above is more fully explained in the detailed description of the preferred form of the invention which follows, this description being illustrated by the accompanying drawings wherein:

FIG. 1 is a plan view, partly in section, of a typical record producing apparatus embodying the present invention;

FIG. 2 is an enlarged elevational view taken along the line 2—2 of FIG. 1 and looking in the direction of the arrows, transferring and conveying elements being shown in other positions;

FIG. 3 is an enlarged fragmentary view in section taken along the line 3—3 of FIG. 2 and looking in the direction of the arrows;

FIG. 4A is an enlarged elevational view taken along the line 4A—4A of FIG. 1 and looking in the direction of the arrows, with portions broken away to show the extruder and a compressor plate associated therewith;

FIG. 4B is a fragmentary elevational view of FIG. 4A, the transferring element and the compressor plate being shown in other positions;

FIG. 6 is an enlarged vertical cross-sectional view showing portions of the label feeding apparatus of FIG. 5;

FIG. 7 is a plan view of the apparatus of FIG. 6, portions being broken away;

FIG. 8 is a vertical cross-sectional view taken along the line 8—8 of FIG. 7 and looking in the direction of the arrows;

Figure 5:
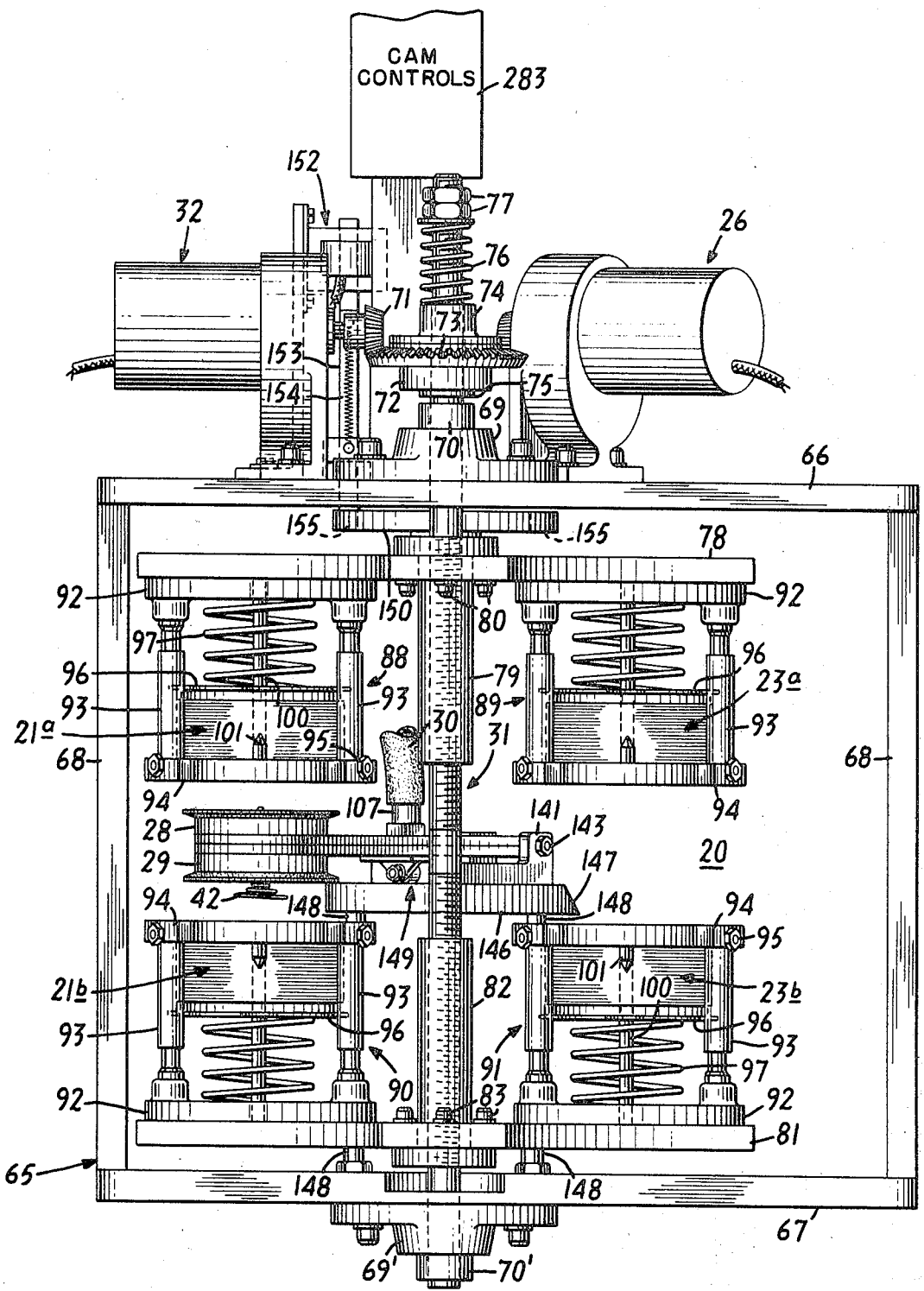
FIG. 5 is an enlarged elevational view taken along the line 5—5 of FIG. 4A and looking in the direction of the arrows, showing the label feeding apparatus.

A general description of the exemplary apparatus and its operation may be had by reference to FIGS. 1, 2 and 4A. A label feeder or picker 20 is adapted to contain an upper stack 21$^a$ and a lower stack 21$^b$ of record labels to be affixed to opposite sides of phonograph records produced in a molding press 22, and an upper stack 23$^a$ and a lower stack 23$^b$ of labels to be affixed to phonograph records produced in a molding press 24. A picker arm 25 is adapted to be rotated by a motor 26 through a shaft 27. Mounted on the end of the picker arm 25 remote from the shaft 27 are upper and lower vacuum plates 28 and 29, respectively, which are provided with suitable vacuum ports and connected through the arm 25 and a conduit 30 to a conventional vacuum system (not shown).

The pairs of stacks 21 and 23 are coupled to a double threaded feed screw 31 which may be rotated by a motor 32, so that the upper and lower stacks of either pair may be simultaneously reciprocated into and out of engagement with the vacuum plates 28 and 29. If the vacuum system connected to the conduit 30 is activated while the stacks are in contact with the vacuum plates, a single label will be grasped by each of the vacuum plates 28 and 29 from each of the pair of stacks 21 or 23, depending upon the position of the picker arm 25.

Figures 9, 10:
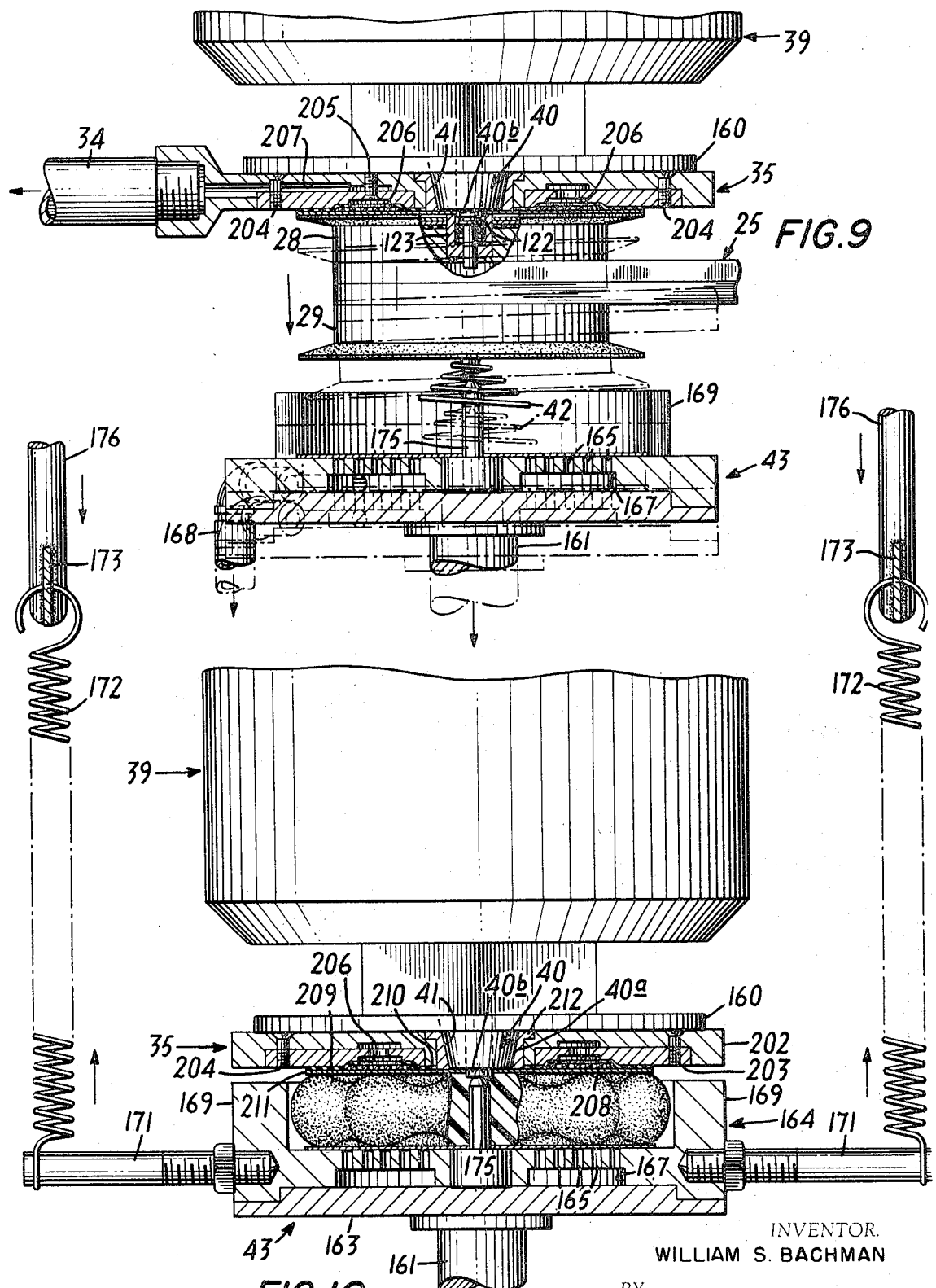
FIG. 9 is an elevational view, partly in section, showing portions of the extruder, the transferring element, the compressor plate and the label feeding apparatus after a pair of labels has been fed to the extruder.
FIG. 10 is an elevational view, partly in section, showing portions of the extruder, the transferring element and the compressor plate after a charge of molding material has been extruded between the pair of labels.

A feeder assembly 33 includes a feeder arm 34, on one end of which is mounted a vacuum plate 35, the lower surface of which (as viewed in FIG. 4A) is provided with vacuum ports. The vacuum plate 35 is connected through the arm 34 and a conduit 36 to a suitable vacuum system (not shown). The feeder plate 35 is adapted to be extended by a motor 37 and a drive screw 38 so as to be placed in abutment with an extruder 39 having a nozzle 40, which extends through an aperture 41 in the feeder plate 35 when the feeder plate abuts the extruder as shown in FIG. 4A. With the feeder plate abutting the extruder, and after a pair of labels have been transferred to the vacuum plates 28 and 29, the picker arm 25 may be rotated by the motor 26 to a position where the vacuum plates are directly beneath the feeder plate 35 (FIG. 9). Then the label picker vacuum system is deactivated and the vacuum system for the feeder assembly 33 is activated, whereupon the record label held by the vacuum plate 28 is transferred to the feeder plate 35, and the label held by the vacuum plate 29 is driven by a separator spring 42 mounted thereon (FIG. 9) against a compressor plate 43 which is reciprocably mounted beneath the extruder 39.

Having transferred the pair of labels from the vacuum plates 28 and 29, the picker arm 25 is swung away from the extruder 39, which is then activated to extrude a charge of molding material between the pair of labels. The compressor plate 43 is then driven upwardly by a suitable hydraulic drive system (not shown), for example, to compress the charge of material between the pair of labels and thereby form an integral unit or package suitable for being carried by the feeder plate 35. The package is shown in phantom at 44 in FIGS. 2 and 4A and resembles in appearance a biscuit or bun, the charge of molding material being sandwiched between the pair of labels.

The compressor plate 43 is then lowered, the biscuit 44 being held against the feeder plate 35 by the vacuum system coupled thereto. The feeder plate (carrying the biscuit) is then retracted from the extruder by the motor 37 to the position shown in phantom at 45 in FIG. 1, and the feeder assembly 33 is rotated by a motor 46 operating through a shaft 47 and suitable cam controls toward the press 24, for example, until the feeder plate reaches the position shown in phantom at 48. Thereupon the motor 37 is energized to extend the feeder plate 35 (and biscuit) into the position shown in FIG. 2, directly centered over the lower mold of the press 24. The feeder vacuum system is deactivated so that the biscuit 44 is dropped on to this lower mold. Thereafter the feeder assembly 33 is retratced and rotated away from the press 24, which is then activated to begin its molding cycle.

After a phonograph record (having the pair of labels affixed to opposite sides thereof) is formed by the press 24, the opposed molds of the press are separated. The arm 49 of an unloader 50, having a vacuum plate 51 connected through a conduit 52 to a suitable vacuum system (not shown), is rotated by a motor 53 (see FIG. 12), acting through a shaft 54 and suitable cam controls, between the molds of the press 24 and is lowered by a pneumatic drive assembly 55 until the vacuum plate 51 engages the phonograph record lying on the lower mold of the press 24. The unloader vacuum system is then activated, so that the vacuum plate 51 grasps the phonograph record, and the unloader arm 49 is lifted and rotated to convey the record to a trimmer 56, which removes the flash at the periphery of the record by means of the interaction of a cutting wheel 57 and a drive wheel 58, the flash dropping into a basket 59. The unloader arm 49 is then swung until the phonograph record is in a position directly above and in alignment with a stacking spindle 61, which is mounted on a pallet 370, at which time the unloader vacuum system is deactivated, permitting the phonograph record to fall upon a stack 62 of previously produced records. After a predetermined number of records are in the stack, a conveyor belt 369 takes the completed stack to a packing station (not shown).

LABEL PICKER

Referring now to FIGS. 4A, 5, 6, 7 and 8, the label picker 20 includes a frame 65 having a top plate 66, a bottom plate 67 and two side plates 68. The right and left-hand feed screw 31 is rotatably mounted on the top plate 66 and the bottom plate 67 by respective bushings 69 and 69′ secured thereto, a pair of collars 70 and 70′ fixedly secured to the feed screw 31 preventing axial displacement thereof with respect to the frame 65. The feed screw 31 is adapted to be rotated in either direction by the motor 32 acting through a pinion 71, a gear 72 and a clutch drive comprising a clutch disc 73 of leather, for example, a pressure plate 74 and a thrust washer 75 which bears against a shoulder formed on the feed screw 31. The gear 72, the thrust washer 75 and the feed screw 31 are urged into driving engagement with one another by a compression spring 76, the spring force being adjusted by a pair of nuts 77 which threadedly engage the feed screw 31.

An upper loading plate 78 is secured to a threaded positioning nut 79 by a plurality of screws 80, the nut 79 threadedly engaging the upper threaded portion (having a right-hand thread) of the feed screw 31, and a lower loading plate 81 is secured to a threaded positioning nut 82 by a plurality of screws 83, the nut 82 threadedly engaging the lower threaded portion (having a left-hand thread) of the feed screw. Thus, the loading plates 78 and 81 may be simultaneously driven toward or away from each other, depending upon the direction of rotation of the feed screw 31. Rotation of the loading plates 78 and 81 is prevented by a pair (FIG. 4A) of guide posts 84 and 85, respectively, which are mounted on the top plate 66 and bottom plate 67, respectively, and are slidably received within a pair of guide post bushings 86 and 87, which are mounted on the loading plates 78 and 81, respectively, suitable bearings being provided within the guide post bushings.

Mounted on the lower surface of the upper loading plate 78 are a pair of label holders 88 and 89, and a pair of label holders 90 and 91 are mounted on the upper surface of the lower loading plate 81, facing and directly opposite the holders 88 and 89, respectively. The holders 88 and 90 receive the stacks of labels 21ª and 21ᵇ, respectively, and the holders 89 and 91 receive the stacks 23ª and 23ᵇ, respectively. Each holder 88, 89, 90 and 91, respectively, includes a base plate 92 suitably secured to the respective loading plate, the base plate mounting a plurality of posts 93 to which is releasably secured a retaining ring 94, the respective retaining ring 94 being secured or released by rotating it in opposite directions with respect to the posts 93. A plurality of screws 95 insures that the retaining ring does not become accidently released from the posts.

In each label holder a pressure plate 96 is urged against the respective stack of labels by a respective compression spring 97 which is seated against the corresponding base plate 92. Thus, the respective stack is driven against the retaining ring 94 and is held by an inner annular surface 98 (FIG. 6) which slopes inwardly in a direction away from the respective base plate 92. The portion of the surface 98 remote from the base plate 92 is serrated in cross section to insure that the vacuum plate 28 or 29 of the picker arm 25 removes only one label at a time from the respective stack. The record labels have the usual centrally located, circular aperture indicated generally at 99, and a post 100, secured to the base plate 92, is provided to prevent lateral displacement of the stack. It should be noted that the post 100 does not extend through the entire stack, and a plurality of lateral guide posts 101 are provided on the ring 94 to insure that the stack is driven coaxially into the annular surface 98.

The picker arm 25 (FIG. 6) includes an upper vacuum arm 102 and a lower vacuum arm 103 secured together by a plurality of screws 104 in suitable sealed relation. The upper vacuum arm 102 has a plurality of ports 105 at the label pickup end and another port 106 which threadedly receives a fitting 107 which is connected to the conduit 30 and communicates with a suitable vacuum system (not shown). The lower vacuum arm 103 has a plurality of ports 110 at the label pickup end and is recessed to provide an elongated channel 108 communicating with an annular channel 109 leading to the ports 110, so that communication is provided between the ports 105 and 110 through the channels 108 and 109 and the conduit 30 to the label picker vacuum system.

Secured against the lower vacuum arm 103 by a plurality of screws 111 is the lower vacuum plate 29, which is provided with a plurality of ports 112 communicating with a pair of annular recesses 113 and 114, the annular recess 113 communicating with the ports 110. The lower vacuum plate 29 has a central bore 115 in which is mounted a lower center pin 116 having an annular groove 117 for supporting and mounting the separator spring 42.

The upper vacuum plate 28 is similarly provided with a plurality of ports 118 communicating with a pair of annular recesses 119 and 120, the recess 120 being in communication with the ports 105. In a central bore 121, an upper center pin 122 is spring-mounted by means of a bushing 123, a spring 124 and a sleeve 125.

Also mounted on the upper vacuum plate 28 by a plurality of screws 126 are an inner gasket 127 and an outer gasket 128, both formed of suitable material, preferably silicone rubber, a vacuum transfer plate 129, and a vacuum masking plate 130, as best viewed in FIG. 7. The vacuum transfer plate 129 is provided with a plurality of radial slots 131 extending from its periphery inwardly to a point overlapping the annular recess 119, and the plates 129 and 130 are preferably soldered together, so that the radial slots 131 define passageways communicating the periphery of the vacuum transfer plate 129 with the label picker vacuum system, the passageways terminating in a plurality of vacuum ports 131ª. The outer rim of the upper vacuum plate 28 protrudes in the form of an annular flange 132, so that the free portion of the outer gasket 128 normally extends conically outwardly from the upper vacuum plate, as best seen in FIG. 8. This insures that the exposed label from the appropriate stack is positively grasped by the vacuum plate 28 when the vacuum system is activated and the stack is brought into engagement with the vacuum plate 28, the force being applied to the exposed label generally along the circular portion adjacent the periphery of the vacuum masking plate 130. Similarly mounted on the lower vacuum plate 29, which is provided with an annular protruding flange 132', are inner and outer gaskets, a vacuum transfer plate having radial slots, and a vacuum masking plate.

Although the lower vacuum plate 29 is rigidly secured to the picker arm 25 by the screws 111, the upper vacuum plate 28 is loosely mounted on the upper vacuum arm 102. A pair of chambers 133 (FIG. 8) in the upper vacuum plate 28 receive a pair of screws 134 secured to the upper vacuum arm 102. A pair of compression springs 135 disposed between the heads of the screws 134 and a pair of annular shoulders 136 insures that the upper vacuum plate 28 is urged against the upper vacuum arm 102. A pair of chambers 133 (FIG. 8) in the upper vacuum plate, the amount being determined by the annular space between the screws 134 and the shoulders 136. Because of the lateral movement permitted the upper vacuum plate 28 with respect to the feeder arm 25, the upper vacuum plate is rendered self-aligning, so that when the opposed stacks of labels are brought into engagement with the two vacuum plates 28 and 29, both vacuum plates will be aligned with the respective stacks, even though there may be some misalignment between the two stacks. Also, proper registry is insured between the upper vacuum plate 28 and the extruder nozzle 40.

The motors 26 (FIG. 4A) drives the shaft 27 through a suitable pinion, gear and clutch drive mechanism in substantially the same manner as the feed screw 31 is driven by the motor 32. The picker arm 25 is rotated by the shaft 27 through a hinge bracket 137 (FIG. 6) which rests upon a collar 138 secured to the shaft 27, positive drive being insured by a Woodruff key 139. The hinge bracket 137 includes a pedestal portion 140 and a pair of lugs 141 between which a hinge pin 142 is mounted by means of a pair of screws 143 extending through the lugs 141, the ends of the screws mating with the ends of the hinge pin 142.

The end of the picker arm 25 remote from the vacuum plates 28 and 29 is bifurcated to form two arms 144 and 145 (FIG. 7) disposed about and in sliding contact with the shaft 27, each arm being provided with a hole to receive the hinge pin 142. In this way no relative rotational movement is permitted between the shaft 27 and the picker arm 25, but the picker arm is permitted some rotation about the axis of the hinge pin 142. A leveling cam 146, having a ramp portion 147 (FIG. 5), is mounted on the bottom plate 67 by means of a pair of posts 148. A cam follower 149 is mounted on the lower vaccum arm 103 to engage the leveling cam 146, so that when the vacuum plates 28 and 29 are rotated to a position between either of the pair of stacks 21 and 23, the vacuum plates are level or parallel with the stacks, as illustrated in FIGS. 4A, 5 and 6, whereas they may be dipped out of that plane in other positions.

Also mounted on the shaft 27 is a detent cam 150 (FIGS. 4A and 5), which rests upon a collar 151 secured to the shaft 27, a Woodruff key (not shown) being provided to prevent relative rotation between the detent cam and the shaft. A solenoid 152 (FIG. 5) of conventional form and suitably mounted on the top plate 66 is adapted to lift a detent pin 153 which is urged against the detent cam 150 by a pair of springs 154 disposed on opposite sides of the detent pin 153, a suitable hole being provided in the top plate 66 to permit the pin to extend therethrough. A plurality of holes 155 provided in the detent cam 150 are adapted to receive the detent pin 153, so that the picker arm 25 may be selectively locked against rotation beneath the extruder 39 or between either of the pairs of stacks 21 or 23.

EXTRUDER AND BISCUIT FORMER

Referring now to FIGS. 4A, 4B and 10, the extruder 39 includes a heating chamber (not shown) from which successive charges of plastic molding material may be selectively extruded by a suitable ram or feed screw, as is well known to the art. Preferably, the extruder 39 comprises an automatically controlled preplasticizer, such as that disclosed in copending application Ser. No. 334,-797, filed Dec. 31, 1963 and assigned to the same assignee as the present application. The extruder 39 includes a plate 160 (FIG. 10), from which extends the nozzle 40. The nozzle 40 preferably includes a tapered portion 40ª, to facilitate the registry therewith of the vacuum plate 35, and an extended portion 40ᵇ of reduced diameter which is adapted to extend through the central, circular aperture of a record label placed in alignment therewith by the picker arm 25.

Reciprocably mounted coaxially of the nozzle 40 is the compressor plate 43, which is secured to a shaft 161, driven by a suitable conventional hydraulic system indicated generally at 162, for example. The compressor plate 43 includes a base plate 163 to which is suitably secured by screws (not shown), for example, a vacuum plate 164 provided with a plurality of vacuum ports 165 which communicate through an annular recessed portion 167 with a conduit 168 connected to a suitable vacuum system (not shown). The vacuum plate 164 is formed with a pair of arcuate spacers 169 and 170 extending from the periphery thereof toward the extruder 39, and mounted on opposite sides of the vacuum plate are a pair of spring supporting pins 171. A pair of tension springs 172, mounted between the pins 171 and a pair of corresponding arms 173 secured to a pair of movable tie rods 176, urge the compressor plate 43 toward the extruder 39 in the direction of the arrows (FIG. 10). The tie rods 176 are lowered as the molding material is being extruded, so that the compressor plate 43 is withdrawn from the nozzle 40. The withdrawal of the plate 43 prevents the nozzle 40 from becoming buried in the extruded material during the discharge of the material and thereby prevents any gaseous discharge from the nozzle 40 from being trapped in the extruded material and forming "blisters" in the biscuit, which would cause imperfections in the finished phonograph record. With a ram-type extruder, the tie rods 176 may be connected to the ram itself, for example. If the extruder is of the feed screw type, the tie rods 176 may be lowered by a suitable drive mechanism when the feed screw drive motor is energized, for example. The extruder 39, the hydraulic system 162 and the label picker 20 are suitably mounted on a main frame 174. Mounted on the vacuum plate 164 and extending toward and coaxially of the nozzle 40 is a cylindrical post 175, the free end of which is tapered to facilitate the feeding of a record label thereon and is adapted to extend into the nozzle 40, as illustrated in FIG. 10.

BISCUIT CARRIER

The feeder assembly or biscuit carrier 33 (FIGS. 4A, 4B, 9 and 10) includes a top frame plate 180 (FIG. 4A) and a bottom frame plate 181 between which is secured a stiffener bracket 182, the top and bottom frame plates being suitably mounted on the lower portion of the main frame 174. Rotatably mounted on and through the top and bottom frame plates 180 and 181 is the shaft 47, which is driven by the motor 46 through conventional pinion, gear and clutch drive mechanism substantially the same as that already described in conjunction with the label picker 20. Secured to the shaft 47 at a point above the plate 180 is a detent cam 183 having three spaced detent segments corresponding to the rotational positions of the shaft 47 from which the feeder plate 35 of the feeder assembly 33 may be extended (FIG. 1) into either of the presses 22 and 24 or beneath the extruder 39. A solenoid 184 mounted on the top frame plate 180 is adapted to retract a detent pin 185 from the detent cam 183, the detent pin 185 being biased toward the cam by a pair of springs 186.

Secured to the shaft 47 is a motor base plate 187 on which is mounted the motor 37. A pair of blocks 188 and 189 support a pair of guide rods 190 and 191 (FIG. 1), the ends of the guide rods remote from the motor 37 being secured to a front yoke plate 192, on which is mounted a cam follower 192a (FIGS. 4A and 4B). A drive nut 193 threadedly engages the drive screw 38 and slidably engages the guide rods 190 and 191. The feeder arm or tube 34 is pivotally mounted at 194 to a carrier 195, which in turn is slidably mounted on the guide rods 190 and 191. A tube holder 196, which slidably engages the tube 34, couples this tube through a suitable toggle link 197 to the drive nut 193. A pair of carrier stops 198 secured to the carrier 195 are adapted to engage a stop plate 199 mounted on the top frame plate 180, and an "extend" limit switch 200 of conventional form mounted on the drive nut 193 is also adapted to engage the stop plate 199. A "retract" limit switch 201 also of conventional form mounted between the front and rear blocks 188 and 189 is adapted to engage the carrier 195.

The feeder vacuum plate 35 of the feeder assembly 33 (FIGS. 9 and 10) includes a plate 202 and a ring 203 secured together by sets of screws 204 and 205, an annular recess 206 in the ring 203 communicating through a passageway 207 (FIG. 9) with the interior of the tube 34 and thus with the feeder vacuum system conduit 36. A perforated vacuum disc 208 (FIG. 10) is secured by a plurality of screws (not shown) over the annular recess 206 of the ring 203, the outer and inner edges of the disc 208 clamping to the ring 203 the inner and outer edges of a large annular gasket 209 and a small annular gasket 210, respectively. The large and small gaskets 209 and 210 are preferably composed of silicone rubber and insure that the vacuum plate 35 securely grasps a record label (indicated at 211) when the feeder vacuum system is activated. Mounted centrally in the plate 202 is a bushing 212, the inner tapered surface 41 of which is adapted to mate with the nozzle 40. Depending from the periphery of the plate 202 is a load sensor switch 324 (FIG. 4B), which indicates the presence of a biscuit on the lower surface of the feeder plate 35.

MOLDING PRESSES

Referring now to FIGS. 1, 2, 3, 11 and 12, the molding press 24 will be described, it being understood that the press 22 is identical therewith. A fixed member 215 (FIG. 2) supports an upper mold 216 which is suitably cored to permit the passage therethrough of steam and water in a conventional manner as required in the molding cycle, the steam and water being introduced by a pair of conduits 217. The mold 216 is recessed at 218 (FIG. 12) to receive a matrix 219 which contains the program information to be impressed upon the record, the matrix 219 being secured to the mold 216 by a plurality of screws 220, for example. The mold 216 is provided with a plurality of bores 221 (FIG. 3), which receive a plurality of knockout pins 222, the upper end of the bores being closed by a plurality of plugs 223. Each pin 222 carries a collar 224 which limits the downward displacement of the pin and also serves as a seat for a compression spring 225 which urges the pin downwardly, the compression spring also bearing against the plug 223. The matrix 219 is provided with a plurality of holes through which the pins 222 may project, so that after a phonograph record (indicated at 226 in FIG. 3) has been produced by the press 24, the record 226 is driven from the martix 219 by the pins 222 as the molds of the press are separated. It should be noted that the pins 222 bear upon the flash, outside of the peripheral bead 227 of the record 226.

Figure 11:
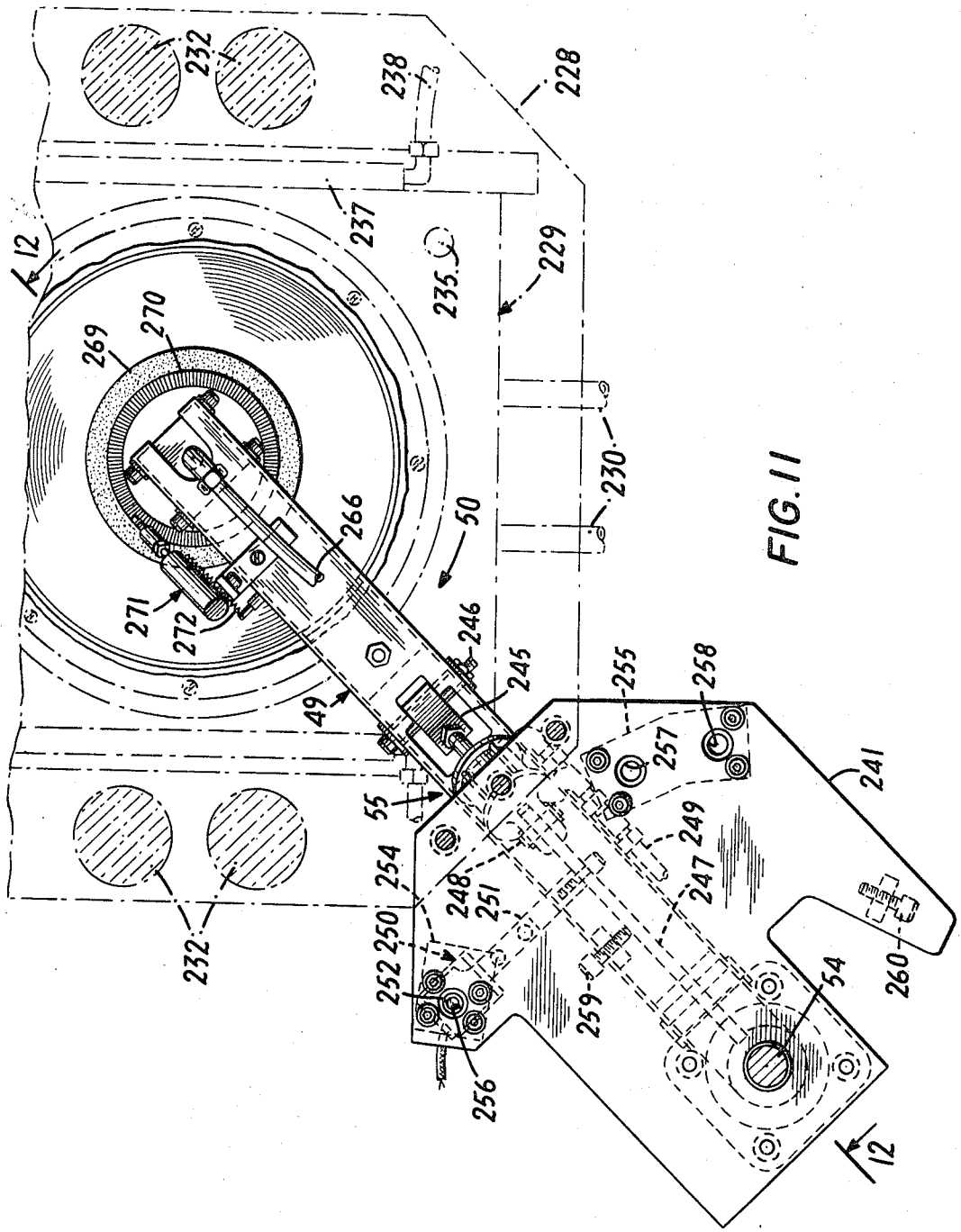
FIG. 11 is a plan view of apparatus for unloading a molded record from a record molding press.

A reciprocable member 228 (FIG. 2) supports the lower mold 229, which is also cored and supplied with steam and water in a suitable manner as required through a pair of conduit 230. The member 228 is adapted to be reciprocated by a suitable conventional hydraulic drive 231 and is guided by four guide posts 232 (FIGS. 1 and 11). The lower mold 229 is also recessed to receive a matrix 233 (FIG. 12), which is provided with a central hole through which projects a post 234 mounted on the lower mold 229. The lower mold is provided with a plurality of holes 235 (FIG. 11) adapted to receive a plurality of pins 236 (FIG. 12) projecting from the upper mold 216, whereby proper alignment between the upper and lower matrices is assured. Secured to the side of the reciprocable member 228 (FIG. 2) facing the feeder assembly 33 are a leveling cam 213, adapted to be engaged by the cam follower 192$^a$, and a stop plate 214, adapted to be engaged by the limit switch 200 and the carrier stops 198.

Mounted laterally and substantially in the plane of the lower matrix 233 (FIGS. 1 and 2) are a pair of tubes 237 connected through a pair of conduits 238 to a suitable source of compressed air (not shown). Each tube 237 is provided with a row of holes 239 (FIG. 2) so located on the tubes that activation of the source of compressed air directs a plurality of air jets across the lower matrix 233 for freeing a record 226 therefrom, the air jets striking the flash at the periphery of the record.

RECORD UNLOADER, TRIMMER AND STACKER

The unloader assembly 50 (FIG. 12) includes an upper plate 240 and a lower plate 241, between which is secured a stiffener bracket 242, the plates 240 and 241 being suitably mounted on the fixed member 215. The motor 53 is mounted on the upper plate 240 and drives the shaft 54 through a suitable pinion, gear and clutch drive mechanism substantially in the same manner as the feed screw 31 is driven by the motor 32. Secured to the shaft 54 is a hinge bracket 243 on which is pivotally mounted an unloader arm 49 by means of a pin 244. The unloader arm 49 is supported by the pneumatic drive assembly 55, which is pivotally connected to the arm 49 by a clevis 245 and pin 246 and to a main bracket 247 by means of a pin 248, the bracket 247 being secured to the shaft 54. A pair of conduits 249 communicate the drive assembly 55 with a suitable source of compressed air (not shown), so that the unloader arm 49 may be lifted or lowered as desired. A solenoid 250, mounted on a bracket 251 extending from the main bracket 247, is adapted to lower a detent pin 252 which is urged upwardly by a pair of extension springs 253. A pair of detent plates 254 and 255 (FIG. 11), secured to the lower frame 241, are provided with detent holes 256, 257 and 258 adapted to receive the detent pin 252 when the unloader arm 49 is at the desired position at the press 24, the stack 62 and the trimmer 56, respectively. A pair of adjustable stop screws 259 and 260, mounted on the lower plate 241, engages the main bracket 247 when the unloader arm is rotated to the press and trimmer positions respectively, and an adjustable stop screw 261 (FIG. 12) mounted on the unloader arm 49 engages the lower mold 229 when the unloader arm 49 is lowered to extract a molded phonograph record therefrom.

Figure 12:
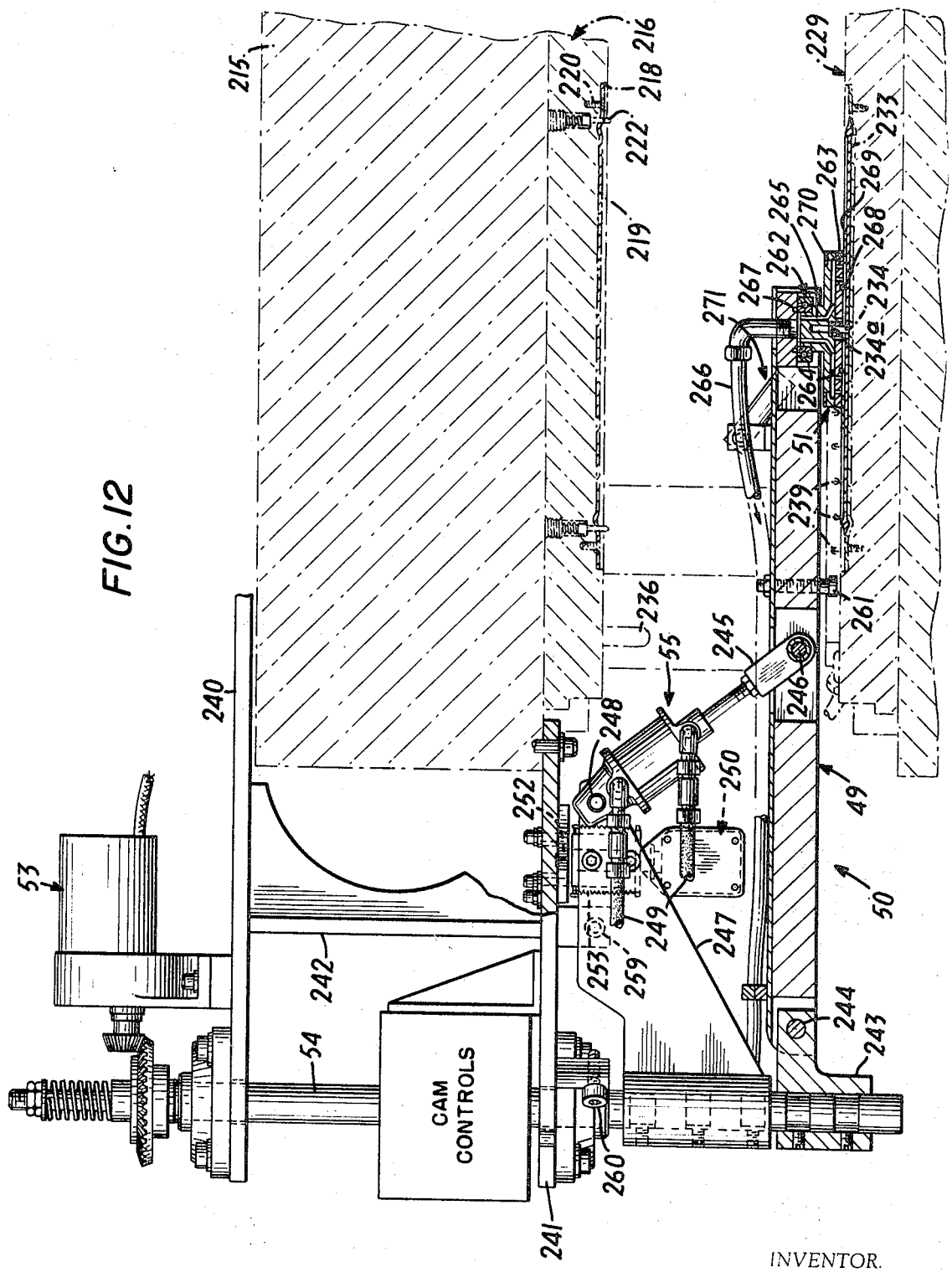
FIG. 12 is an elevational view, partly in section, taken along the line 12—12 of FIG. 11 and looking in the direction of the arrows.
Figure 13:
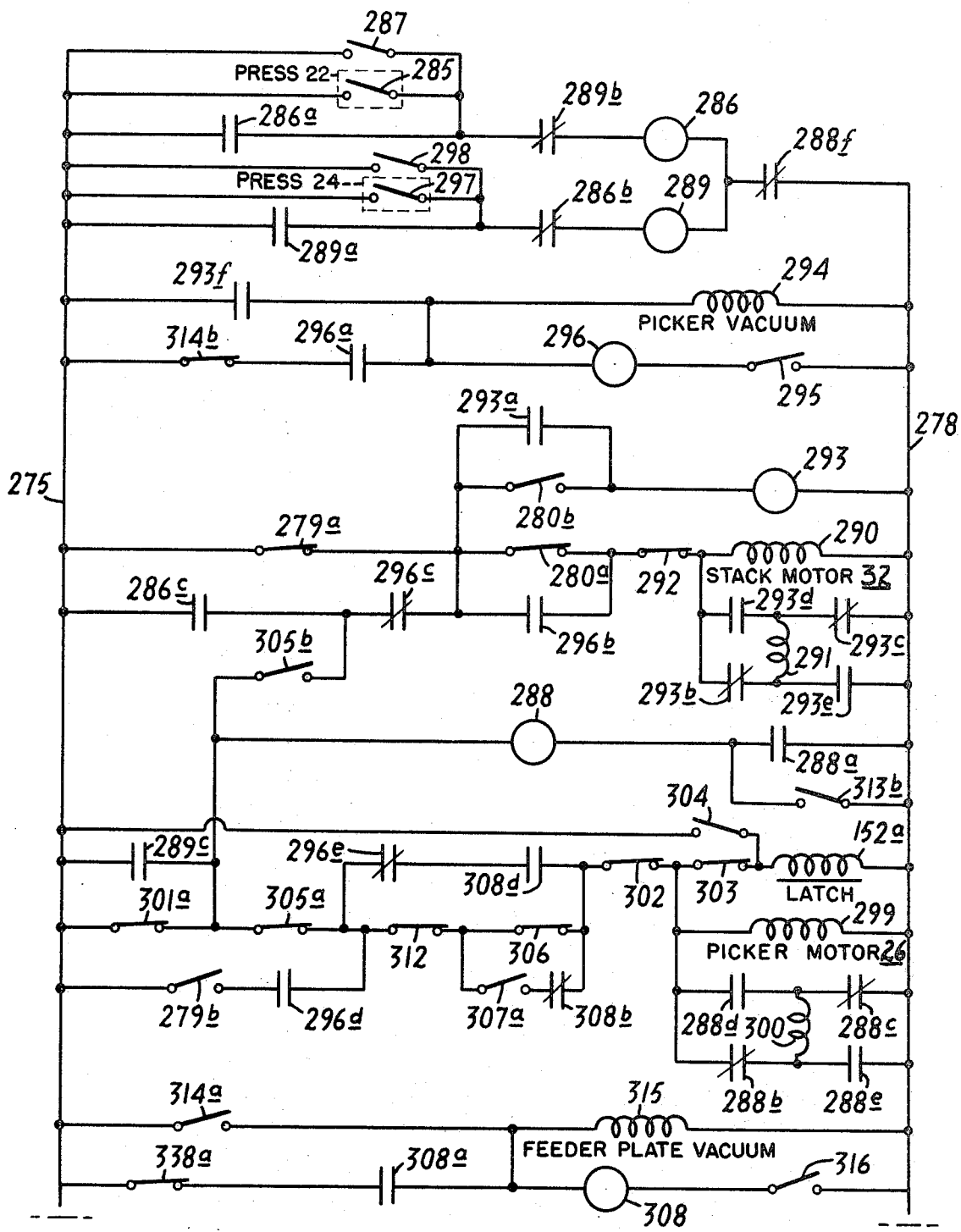
FIGS. 13–16 are schematic diagrams of exemplary electrical circuitry for controlling the operation of the molding apparatus illustrated in FIGS. 1–12.
Figure 14:
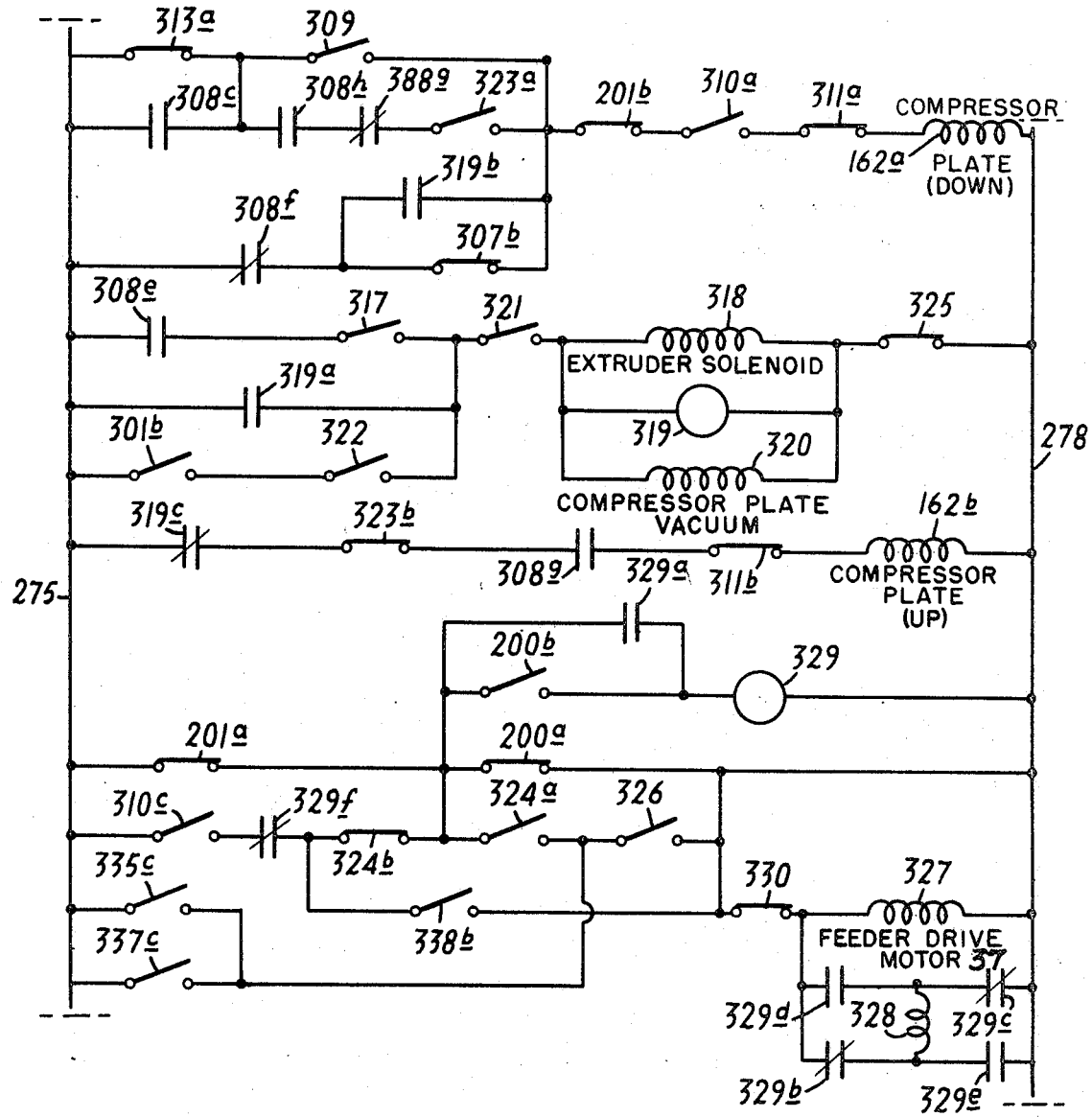
Figure 15:
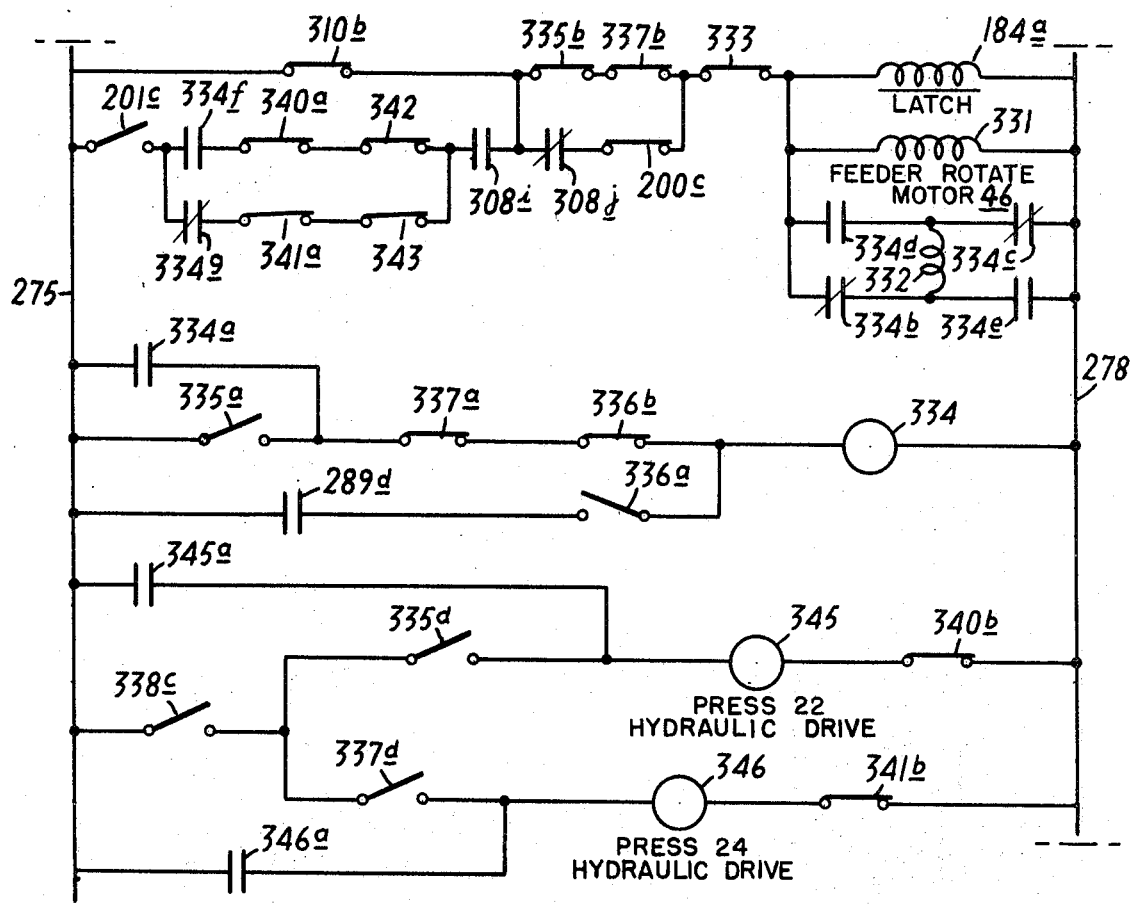
Figure 16:
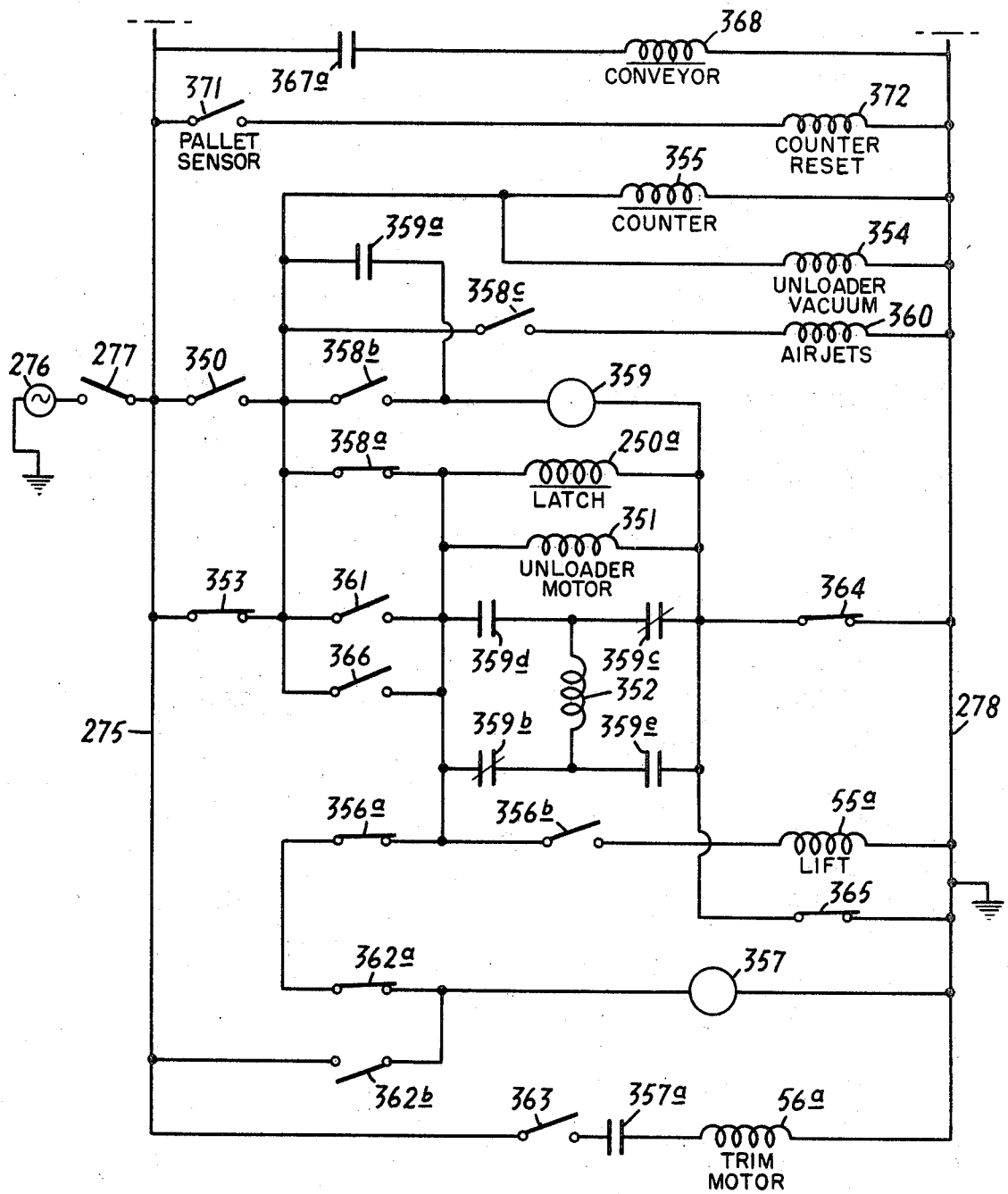

The vacuum plate 51 is rotatably mounted at the end of the unloader arm 49 remote from the shaft 54 by means of an antifriction bearing 262 (FIG. 12). A plurality of vacuum ports 263 spaced radially about the plate 51 communicate through an annular recess 264, a plurality of passageways 265 and a conduit 266 to a suitable vacuum source (not shown). An annular ring 267, mounted on the unloader and preferably composed of silicone rubber, provides a fluidtight seal between the unloader arm 49 and the vacuum plate 51, and an annular ring 268 and a gasket 269, both preferably composed of silicone rubber, mounted on the lower surface of the vacuum plate 51 radially within and without the vacuum ports 263, respectively, insure that the vacuum plate 51 can positively grasp and hold a phonograph record.

A ring 270 having a ratcheted upper surface is secured to the periphery of the vacuum plate 51 (FIG. 11) and is adapted to be engaged by a pawl 271 mounted on the arm 49 and urged against the ring 270 by an extension spring 272. Thet pawl 271 permits the vacuum plate 51 to be rotated only in the clockwise direction as viewed in FIG. 11.

The unloader 50′ and the trimmer 66′ used with the press 22 are identical to those used with the press 24, except that the pawl 271′ is mounted on the opposite side of the arm 49′ and so permits only counterclockwise rotation of the vacuum plate 51′ (as viewed in FIG. 1).

OPERATION

The operation of the molding apparatus will now be described in conjunction with the electrical control circuitry illustrated in FIGS. 13–16. The circuit components are connected between a power conductor 275, which may be connected to a suitable source 276 of electric power by a switch 277, and ground return conductor 278.

Mounted on the label picker top plate 66 are a stack open limit switch 279 and a stack closed limit switch 280, which are adapted to be engaged by a pair of cams 281 secured to a cam rod 282 which is mounted on the upper loading plate 78. A plurality of cams secured to the shaft 27 and located within the cam control box 283 are adapted to engage a plurality of switches in this box in accordance with the rotational position of the shaft 27 and therefore the picker arm 25.

When the stage is reached in the molding cycle at which water is introduced in the upper and lower molds of the press 22, a temperature sensitive switch 285 is closed thereby energizing a relay solenoid 286. (If desired, the relay 286 may be energized through a normally open manual switch 287.) The relay 286 remains energized through the holding contact 286$^a$, regardless of the condition of the switches 285 and 287, until the normally closed contact 288$^f$ is opened. The normally closed contact 288$^b$ is opened, thereby disarming the relay solenoid 289, which operates in conjunction with the press 24.

The normally open contact 286$^c$ of the relay 286 is closed, energizing the armature and field windings 290 and 291 of the stack motor 32, and the opposed stacks 21$^a$ and 21$^b$ are driven towards the vacuum plates 28 and 29 (the picker arm 25 normally being in the stack 21 position), until the normally closed stack closed limit switch 280$^a$ is opened to deenergize the stack motor. (The normally closed manual switch 292 permits the stack motor to be disarmed, if desired.)

The normally open stack closed limit switch 280$^b$ is closed to energize the stack motor reversing relay 293, which remains energized through the holding contact 293$^a$. The normally closed contacts 293$^b$ and 293$^c$ are opened and the normally open contacts 293$^d$ and 293$^e$ are closed to reverse the connection of the field coil 291 in the circuit, so that the stack motor, when again energized, will rotate in the opposite direction and withdraw the stacks 21$^a$ and 21$^b$ from the vacuum plates 28 and 29.

The contact 293$^f$ is also closed, energizing the picker vacuum coil 294, by means of which the picker vacuum system is activated by suitable means known to the art. When the desired degree of vacuum is attained, the vacuum sensing switch 295 is closed, energizing the relay solenoid 296, which remains energized through the holding contact 296$^a$. A record label must be grasped by each of the vacuum plates 28 and 29 before the switch 295 will be closed, so that when the supply of labels is exhausted in either of the holders 88 and 90, the machine will stop. A pair of labels having been grasped by the vacuum plates 28 and 29, the contact 296$^b$ is closed to energize the stack motor 32 and withdraw the stacks until the normally closed stack open limit switch 279$^a$ is opened, thereby de-energizing both the stack motor 32 and the reversing relay 293. Although the contact 293ᶠ is now open, the picker vacuum coil 294 remains energized through the closed holding contact 296ᵃ.

When the press 24 calls for water, the thermal switch 297 is closed to energize the relay solenoid 289, a manual switch 298 permitting this relay to be operated manually if desired. The contact 289ᶜ is closed to energize the detent solenoid coil 152ᵃ and the armature winding 299 and field winding 300 of the picker arm motor 26, to lift the detent pin 153 and rotate the picker arm 25 in a counterclockwise direction away from the stack 21 position. (The normally closed stack 21 position switch 301ᵃ is open when the picker arm is in the stack 21 position.) The detent solenoid and the picker motor may be disarmed by the normally closed manual switch 302, and the switches 303 and 304 permit the detent to be operated either automatically or manually. The picker motor runs until the picker arm reaches the stack 23 position, where the normally closed stack 23 position switch 305ᵃ is opened. At this time the switch 305ᵇ is closed energizing the stack motor, which reciprocates the stacks 23ᵃ and 23ᵇ into and out of engagement with the vacuum plates 28 and 29, as before.

When the stacks 21 and 23 return to the open position the switch 279ᵇ is closed, bridging the stack position switches 301ᵃ and 305ᵃ, the contact 296ᵈ being closed when the picker vacuum is established. The picker motor 26 is now energized, and the picker arm 25 is rotated away from the pairs of stacks 21 and 23, the cam follower 149 descending the ramp 147 of the leveling cam 146 until the picker arm rests upon the pedestal 140 of the hinge bracket 137, thereby facilitating the rotation of the arm into position below the extruder. The arm continues rotation to a "dwell" position between the stack 23 and the extruder 39, at which position the normally closed switch 306 is opened. If the feeder plate 35 is then positioned to engage the nozzle 40 as illustrated in FIGS. 9 and 10, the switch 307ᵃ will be closed, and in the absence of a vacuum on the feeder plate 35 the normally closed contact 308ᵇ will also be closed, thereby bridging the switch 306 and permitting the picker arm 25 to continue rotation to the nozzle position.

Before the arm reaches the nozzle position, the switch 309 is closed, energizing the hydraulic drive coil 162ᵃ, whereby the compressor plate 33 is driven downwardly by suitable means known to the art. (The normally open switch 310ᵃ is closed when the feeder arm 34 is in the nozzle position. The manual switches 311ᵃ and 311ᵇ permit the hydraulic drive 162 to be disarmed if desired.) The compressor plate 43 being down, the picker arm 25 rotates to the nozzle position, at which time the switch 312 is opened to deenergize the picker motor 26 and detent solenoid.

The switch 313ᵃ is also opened, deenergizing the hydraulic drive solenoid 162ᵃ, whereupon the compressor plate 43 brings the vacuum plate 28 into engagement with the feeder plate 35 under the action of the springs 172 (see FIG. 9). At the same time the switch 313ᵇ is closed, energizing the picker motor reversing relay 288, which remains energized through the holding contact 288ᵃ. The contacts 288ᵇ and 288ᶜ are opened and the contacts 288ᵈ and 288ᵉ are closed, so that when the picker motor 26 is again energized the picker arm 25 will be rotated in the clockwise direction away from the extruder. The contact 288ᶠ is also opened, deenergizing whichever one of the relays 286 and 289 that was previously energized.

When the vacuum plate 28 is in engagement with the feeder plate 35, the vacuum transfer switches 314ᵃ and 314ᵇ are closed and opened, respectively, deenergizing the picker vacuum coil 294 (and thus the picker vacuum system) and energizing the feeder vacuum coil 315. When the upper label is properly transferred from the vacuum plate 28 to the feeder plate 35, the vacuum sensing switch 316 is closed, thereby energizing the feeder plate vacuum relay 308, which remains energized through the holding contact 308ᵃ. When the picker vacuum system is deactivated, the lower label is driven by the separator spring 42 from the lower vacuum plate 29 over the post 175 and into engagement with the compressor plate 43.

Contact 308ᶜ closes and drives the compressor plate down, the switch 309 still being closed. Contact 308ᵈ also closes, energizing the detent solenoid and the picker motor 26, so that the picker arm is rotated until it returns to the stack 21 position and the limit switch 301ᵃ is opened. (The stack 23 position switches 305ᵃ and 305ᵇ do not operate during the return of the picker arm 25 because they are actuated to a one-way roller which is not responsive to movement of the picker arm 25 in the clockwise direction.) As the picker arm 25 returns from the extruder 39, the switch 309 opens allowing the compressor plate 43 to rise under the action of the springs 172.

The clockwise rotation of the picker arm 25 also closes the switch 317, which does not respond to counterclockwise rotation of this arm, energizing the extruder solenoid coil 318, the relay solenoid 319, and the compressor plate vacuum coil 320, which remain energized through the holding contact 319ᵃ. (The contact 308ᵉ is closed in the presence of a vacuum on the feeder plate 35. The normally closed manual switch 321 is provided to permit the disarming of the extruder solenoid if desired). With an extruder of the type including a reciprocable ram, energization of the coil 318 drives the ram in the downward direction to extrude a charge of molding material through the nozzle 40. During the extrusion of the molding material, the vacuum on the compressor plate insures that the lower label is held securely against the compressor plate 43. The extruder 39 may be purged, if desired, by closing the manual switch 322 while the picker arm 25 is in the stack 21 position (during which time the contact 301ᵇ is closed).

When the extruder ram begins its descent, the ram upper limit switch 323ᵃ opens, disabling the hydraulic drive solenoid coil 162ᵃ. The tie rods 176 descend with the extruder ram, releasing the tension in the springs 172 and permitting the compressor plate 43 to recede from the nozzle 40 during the extrusion of the molding material. This venting of the nozzle during the delivery of the molding material prevents the formation of "blisters" in the biscuit, as discussed above. (The switch 323ᵃ is opened before the contact 288ᵍ returns to its normally closed position, which does not occur until the picker arm 25 returns to the stack 21 position.)

Should the vacuum system fail at the feeder plate during the extrusion process, either due to a failure of the feeder vacuum system or because the upper label is dislodged by the extruded molding material, the contact 308ᶠ would return to its normally closed position to energize the hydraulic drive coil 162ᵃ and lower the compressor plate 43, inasmuch as the contact 319ᵇ is closed during extrusion. As will be discussed hereinafter, the load sensor switch 324ᵃ is open in the absence of a biscuit on the feeder plate 35, and so the feeder plate 35 could not be withdrawn from the nozzle position. Therefore, the difficulty is immediately apparaent and readily rectified.

At the completion of the ram stroke, the ram lower limit switch 325 is opened, deenergizing the hydraulic drive coil 318, the relay 319 and the feeder vacuum coil 320. The contact 319ᶜ returns to its normally closed position, thereby energizing the hydraulic drive coil 162b (provided there is a vacuum on the feeder plate and the contact 308ᵍ is closed), and the compressor plate 43 is driven upwardly with a force of approximately 100 pounds, for example, thereby squeezing the pair of labels and the charge of molding material into the desired biscuit-shaped integral package which may be readily transported by the feeder plate 35 (see FIG. 10), a central hole being provided through the biscuit by the post 175. The extruder ram is returned to its original position by any suitable means (not shown) known to the art, opening the ram upper limit switch 323$^b$ to deenergize the hydraulic drive coil 162$^b$ and closing the limit switch 323$^a$ to energize the coil 162$^a$, whereupon the compressor plate 43 is driven downwardly (provided there is a vacuum on the feeder plate and the contact 308$^h$ is closed).

When the compressor plate 35 has completed its downward travel, the limit switch 326 is closed, energizing the armature winding 327 and the field winding 328 of the feeder drive motor 37, inasmuch as the manual disarming switch 330 is closed and the presence of a biscuit on the feeder plate closes the load sensor switch 324$^a$. The feeder plate 35 being in the nozzle position, the extend limit switch 200$^a$ is open and switch 200$^b$ is closed, energizing the reversing relay 329 (which remains energized through the holding contact 329$^a$), so that the contacts 329$^b$ and 329$^c$ are open and contacts 329$^d$ and 329$^e$ are closed and the feeder plate 35 is disengaged from the nozzle by the action of the toggle link 197 (see FIGS. 4A and 4B) and retracted until the retract limit switch 201$^a$ is opened, which deenergizes both the drive motor 37 and the reversing relay 329. (The field winding 328 is now connected such that energization of the drive motor will extend the feeder plate.) Should the vacuum at the feeder plate 35 fail for any reason while the plate is being retracted from the nozzle 40, so that the normally closed load sensor switch 324$^b$ recloses, the open contact 329$^f$ prevents the switch 201$^a$ from being bridged. The switch 201$^b$ is also opened, permitting the compressor plate 43 to be raised by the springs 172 until the post 175 corks the nozzle 40 and thus prevents any "drool" from the extruder.

The switch 201$^c$ is also closed, energizing the detent solenoid coil 184$^a$ and the armature winding 331 and field winding 332 of the feeder rotate motor 46, the contact 308$^l$ and the manual disarming switch 333 being closed. The direction of rotation of the feeder arm 35 is determined by the reversing relay 334. If the relay 334 is deenergized, the feeder arm 33 will be rotated to the press 22 position (corresponding with the stack 21) where the stack 22 limit switch 335$^a$ will be closed, energizing the reversing relay so that the feeder arm 33 may be returned to the nozzle position. If the press 24 calls for water and the relay solenoid 289 is energized, the contact 289$^d$ will be closed during the cycle of the picker arm, and during the counterclockwise travel of the picker arm 25 the switch 336$^a$ will be closed, energizing the relay 334. This relay remains energized through the holding contact 334$^a$, because the switch 336$^b$ is opened and closed while the switch 336$^a$ remains closed. The switch 336$^b$ is provided so that the relay 334 will be deenergized during the picker arm cycle if the relay 289 has not been energized. The switches 336$^a$ and 336$^b$ are actuated by a one-way roller, so that they are not responsive to clockwise rotation of the picker arm 25. If the relay 334 has been energized to rotate the feeder arm to the press 24, the feeder arm press 24 position limit switch 337$^a$ will be opened so that the feeder arm can be returned to the nozzle position.

The normally closed press limit switches 340$^a$ and 341$^a$ prevent rotation of the feeder arm 33 if the presses 22 and 24, respectively, are closed (i.e., the upper and lower molds are in engagement), and the normally closed switches 342 and 343 prevent rotation of the feeder arm 33 if the unloader arm 49' or 49 is in the press 22 or 24, respectively. The contacts 334$^f$ and 334$^g$ prevent the switches corresponding to the inactive press from bridging those corresponding to the active press.

After the feeder arm 33 has been rotated to the press 22 or 24, the press position limit switch 335$^b$ or 337$^b$, respectively, opens to deenergize the latch solenoid 184 and the feeder rotate motor 46. The corresponding limit switch 335$^c$ or 337$^c$ also closes, energizing the feeder drive motor 37 through the closed load sensor switch 324$^a$, providing the biscuit is still on the feeder plate. The feeder plate 35 and biscuit are extended into the desired press until the extend limit switch 200$^a$ is opened, at which time the limit switch 200$^b$ is closed to energize the reversing relay 329, so that the feeder plate 35 may be retracted. When the feeder plate 35 has been extended into the press, the limit switch 338$^a$ (which may be mounted on the carrier 195 but is actuated only at the presses) is opened, deenergizing the feeder plate vacuum and allowing the biscuit to fall from the feeder plate, the post 234 mounted on the lower mold 229 mating with the central hole through the biscuit. The normally closed load sensor switch 324$^b$ and the limit switch 338$^b$ (which operates only at the presses) are closed, so that the feeder drive motor 37 is energized and the feeder plate is retracted from the press, until the retract limit switch 201$^a$ is opened. The feeder vacuum being lost, the contact 308$^j$ is closed, and as the feeder plate is retracted, the extend limit switch 200$^c$ is closed, and so the feeder arm 33 is rotated to the nozzle position, where the limit switch 310$^b$ is opened.

The absence of vacuum on the feeder plate 35 recloses the normally closed contact 308$^f$, energizing the hydraulic drive solenoid 162$^a$ and lowering the compressor plate 43, and the return of the feeder arm to the nozzle position closes the switch 310$^c$, causing the feeder plate 35 to be extended to a position beneath the nozzle (as illustrated in FIG. 4B), after which the feeder plate 35 is driven into the desired engagement with the nozzle by the action of the toggle link 197. When the feeder plate 35 is in the nozzle position, the extend limit switch 200$^b$ is closed, energizing the reversing relay 329 and conditioning the drive motor 37 to retract the feeder arm 33 after the next charge of molding material has been extruded. The feeder plate 35 being in engagement with the nozzle, the switch 307$^b$ is opened and the hydraulic drive solenoid 162$^a$ is deenergized, so that the post 175 is raised by the springs 172 to plug the nozzle and prevent possible drool of molding material.

When the feeder plate 35 is extended into either press, the extend limit switch 338$^c$ is closed, and if the feeder arm 33 is in the press 22 position, the switch 335$^d$ is closed to energize the press 22 hydraulic drive relay 345 (which remains energized through the holding contact 345$^a$). The hydraulic drive 231 is then activated by suitable means to drive the lower mold 229 into engagement with the upper mold 216, provided a pair of suitable fail-safe switch means (not shown) in the press drive circuitry are closed to indicate that the unloader and feeder arms are withdrawn from the press. The press continues through its molding cycle under the control of any suitable conventional control circuitry (not shown) and when the lower member of the press is lowered, the press limit switch 340$^b$ is opened. Similarly, if the feeder arm 33 is in the press 24 position, the switch 337$^d$ is closed to energize the press 24 hydraulic drive relay 346.

After a record has been pressed, the lower member 228 is lowered under direction of the press control circuitry (not shown) and the record is driven from the upper matrix 219 by the action of the spring-actuated knockout pins 222. If desired, the knockout pins 222 may be actuated by suitable solenoid means, which may be energized by or in response to the signal from the press control circuitry which lowers the lower member 228. When the lower press member 228 starts down, the switch 350 is closed, energizing the armature winding 351 and the field winding 352 of the unloader motor 53 as well as the detent solenoid coil 250$^a$. The unloader arm 49 is rotated in the counterclockwise direction from its quiescent position above the stack 62 toward the press, reclosing the stack position cam switch 353, so that the unloader arm 49 continues its rotation toward the press regardless of the condition of the switch 350, which is actuated by a one-way roller so that it is not responsive to upward movement of the lower press member 228. The unloader vacuum solenoid coil 354 and the counter solenoid coil 355 are energized with the unloader motor. As the unloader arm begins its rotation, the switch 356ᵃ is opened to disarm the trimmer relay 357, and the switch 356ᵇ is closed to energize the pneumatic lift solenoid 55ᵃ, so that the vacuum plate 51 is raised to clear the post 234 on the lower mold 229.

When the unloader arm 49 reaches the press position, the limit switch 358ᵃ is opened to deenergize the motor 53 and to release the latch pin 252, and the switch 358ᵇ is closed to energize the unloader motor reversing relay 359, which remains energized through the holding contact 359ᵃ. At the same time the pneumatic lift solenoid 55ᵃ is deenergized, permitting the unloader vacuum plate 51 to drop onto the pressed phonograph record, a central aperture 234ᵃ in the vacuum plate receiving the post 234 of the lower mold. The switch 358ᶜ is also closed, energizing the air jet solenoid 360 to supply compressed air through the conduits 238 to the holes 239, the resulting air jets striking the flash of the pressed record to free it from the lower matrix 233 and to permit it to be readily extracted from the press by the unloader 50.

When the desired degree of vacuum is attained on the unloader plate 51 (indicating that the pressed record is firmly grasped), a suitable pressure sensitive device (not shown) closes the switch 361 to energize the pneumatic lift 55, the motor 53 and the detent solenoid 250ᵃ, so that the unloader arm is raised and rotated in the clockwise direction to the trimmer 56. The unloader arm may be withdrawn from the press by the manual switch 366, if desired, regardless of the degree of vacuum on the unloader plate. The switch 353 is actuated by a one-way roller and is not responsive to clockwise rotation of the unloader arm. As the unloader arm 49 passes the stack position, the switch 356ᵇ is opened, lowering the phonograph record to a horizontal plane to facilitate its trimming, and the switch 356ᵃ is closed to energize the trim motor relay 357 and the trim motor winding 56ᵃ, so that the cutting wheel 57 and the drive wheel 58 are in rotation when the unloader arm reaches the trimmer position. For automatic operation of the trim motor 56, the switches 362ᵃ and 363 are closed and the switch 362ᵇ is open. If manual operation of the trim motor is desired, the switch 362ᵃ is opened, the switch 362ᵇ is closed, and the motor may be selectively operated by the switch 363.

When the unloader arm 49 is in the trim position, the record is rotated by the drive wheel 58 (while being held by the vacuum plate 51), driving the flash between the cutting wheel and the drive wheel. The trim position limit switch 364 is opened, and the presence of flash opens the flash detector switch 365, so that the unloader motor 53 and the motor reversing relay 359 are deenergized. After the flash has been removed, the flash detector switch 365 is closed, and the unloader arm 49 is rotated in the counter-clockwise direction to the stack position, where the stack position limit switch 353 is opened. This deenergizes the unloader motor 53 and the vacuum solenoid 354, so that the trimmed record falls on the stack.

For each cycle of the unloader 50, a suitable counter (not shown) is advanced by the counter solenoid 355, and after the desired number of records are in the stack 62, a relay (not shown) in the counter closes the contact 367ᵃ to energize the conveyor solenoid 368, whereby the conveyor belt 369 is activated to transport the pallet 370 to a packing station (not shown) and to bring an empty pallet into the stacking position. The movement of the pallet 370 closes the pallet sensing switch 371 to energize the reset coil 372, whereby the counter is reset to count a new stack of trimmed records.

While the fundamental novel features of the invention have been shown and described, it will be understood that various substitutions, changes and modifications in the form and details of the apparatus illustrated and its method of operation may be made by those skilled in the art without departing from the spirit and scope of the invention. For example, the apparatus may be readily modified to permit the automatic operation of three or more molding presses if desired. Furthermore, the apparatus may be suitably modified to permit the automatic production of molded articles other than phonograph records.

I claim:
1. In apparatus for producing phonograph records including an extruder having a nozzle for delivering a plastic molding material and at least one record molding apparatus, the combination of
    label picker means including at least one pair of stacks of record labels for feeding a pair of labels into molding-material-receiving relationship with the extruder nozzle, the pair of stacks corresponding to the molding apparatus,
    means responsive to the label picker means for activating the extruder to extrude a charge of molding material between the pair of labels,
    means responsive to the extruder for transferring the charge of molding material and the pair of labels from the extruder to the corresponding molding apparatus, and
    means responsive to the transferring means for activating the corresponding molding apparatus to produce a phonograph record having the pair of labels affixed to opposite sides thereof.
2. The combination according to claim 1, wherein the label picker means includes first vacuum means for releasably grasping the pair of labels and the transferring means includes second vacuum means for releasably grasping the charge of molding material and the pair of labels.
3. The combination according to claim 1, wherein the record labels have a central aperture and the transferring means includes vacuum means for releasably grasping one of the pair of labels and is adapted to position the one label with respect to the extruder nozzle such that the charge of molding material is extruded through the central aperture of the one label.
4. The combination according to claim 1, including means ot form the charge of molding material and the pair of labels into an integral unit suitable for being carried by the transferring means as an integral unit.
5. The combination according to claim 1, including means for trimming the periphery of the phonograph record to produce a finished phonograph record and means for conveying the phonograph record from the molding apparatus to the trimming means.
6. The combination according to claim 2, wherein the label picker means includes a picker arm, a pair of vacuum plates mounted substantially at one end of the picker arm on opposite sides thereof, each vacuum plate having a surface adapted to contact a different one of the pair of stacks of record labels and a lateral surface extending from the stack-contacting surface generally toward the picker arm, and each vacuum plate being provided with a plurality of vacuum ports in the lateral surface adjacent to the stack-contacting surface, the vacuum ports communicating with the first vacuum means, and a gasket mounted on the lateral surface at the side of the vacuum ports remote from the stack-contacting surface extending outwardly away from the picker arm.
7. The combination according to claim 5, wherein the conveying means includes third vacuum means for releasably grasping the finished phonograph record.
8. The combination according to claim 5, wherein the conveying means is adapted to hold the phonograph record while the trimming means trims the periphery of the phonograph record.
9. The combination according to claim 5, wherein the conveying means is adapted to stack the successively produced finished phonograph records.
10. A method of producing phonograph records, comprising the steps of feeding a pair of record labels into molding-material-receiving relationship with an extruder, extruding a charge of molding material between the pair of labels, transferring the charge of molding material and the pair of labels from the extruder to a record molding apparatus, activating the molding apparatus to produce a phonograph record having the pair of labels affixed to opposite sides thereof, freeing the phonograph record from the molding apparatus, conveying the phonograph record from the molding apparatus to a trimmer, and trimming the periphery of the phonograph record.

11. A method of producing phonograph records, comprising the steps of feeding a pair of record labels into molding-material-receiving relationship with an extruder, extruding a charge of molding material between the pair of labels, transferring the charge of molding material and the pair of labels from the extruder to a record molding apparatus, activating the molding apparatus to produce a phonograph record having the pair of labels affixed to opposite sides thereof, extracting the phonograph record from the molding apparatus with conveying means, conveying the phonograph record from the molding apparatus to a trimmer, and simultaneously holding the photograph record with the conveying means and trimming the periphery of the phonograph record with the trimmer.

12. In apparatus for producing phonograph records including an extruder having a nozzle for delivering a charge of plastic molding material and a record molding apparatus, the combination of plate means for receiving the charge of molding material, means for withdrawing the plate means from the nozzle during the delivery of the charge of molding material, and means for transferring the charge of molding material to the molding apparatus.

13. A method of producing phonograph records, comprising the steps of simultaneously extruding a charge of molding material from the nozzle of an extruder onto a plate and withdrawing the plate from the nozzle as the charge of molding material is extruded, transferring the charge of molding material from the extruder to a record molding apparatus, activating the molding apparatus to produce a phonograph record, conveying the phonograph record from the molding apparatus to a trimmer, and trimming the periphery of the phonograph record.

14. In apparatus for producing phonograph records including an extruder having a nozzle for delivering a plastic molding material and a record molding apparatus, the combination of label picker means including means for supporting a stack of record labels, a picker arms, a vacuum plate mounted on the picker arm, the vacuum plate having a surface adapted to contact the stack of record labels and a lateral surface extending from the stack-contacting surface generally toward the picker arm, the vacuum plate being provided with a plurality of vacuum ports in the lateral surface adjacent to the stack-contacting surface, the vacuum ports communicating with a vacuum system, a gasket mounted on the lateral surface at the side of the vacuum ports remote from the stack-contacting surface extending outwardly away from the picker arm, and means for bringing the vacuum plate into engagement with the stack of record labels to grasp a label therefrom.

15. The combination according to claim 14, including means for deactivating the vacuum system, and means mounted on the vacuum plate for driving a label held thereby from the vacuum plate when the vacuum system is deactivated.

16. The combination according to claim 14, including means for supporting a second stack of record labels, a second vacuum plate mounted on the picker arm, the second vacuum plate having a surface adapted to contact the second stack of record labels and a lateral surface extending from the stack-contacting surface generally toward the picker arm, the second vacuum plate being provided with a plurality of vacuum ports in the lateral surface adjacent to the stack-contacting surface, the vacuum ports communicating with the vacuum system, a gasket mounted on the lateral surface of the second vacuum plate at the side of the vacuum ports remote from the stack-contacting surface extending outwardly away from the picker arm, and means for bringing the second vacuum plate into engagement with the second stack of record labels to grasp a label therefrom.

17. The combination according to claim 16, wherein the record labels have a central aperture, each vacuum plate includes a centering pin extending from the stack-contacting surface generally away from the picker arm, and one of the vacuum plates is mounted on the picker arm to permit relative lateral movement therebetween, whereby when the vacuum plates are brought into engagement with the stacks of record labels, each centering pin will enter the central aperture of the corresponding stack of labels and automatically align the vacuum plates with the corresponding stacks.

18. In apparatus for producing phonograph records including an extruder having a nozzle for delivering a plastic molding material and a record molding apparatus, the combination of label picker means including means for supporting a pair of stacks of record labels, the record labels having a central aperture, a picker arm, a pair of vacuum plates mounted on the picker arm, one of the vacuum plates being mounted on the picker arm to permit relative lateral movement between the vacuum plates, each vacuum plate having a surface adapted to contact a different one of the pair of stacks of record labels, each vacuum plate being provided with a plurality of vacuum ports communicating with a vacuum system, means for bringing the vacuum plates into engagement with the pair of stacks of record labels to grasp a pair of labels therefrom, and means for automatically aligning the vacuum plates with the corresponding stacks of labels when the vacuum plates are brought into engagement with the stacks of record labels, the automatic aligning means including means on each vacuum plate adapted to cooperate with the corresponding stack of labels.

19. In apparatus for producing phonograph records including an extruder having a nozzle for delivering a plastic molding material and a record molding apparatus, the combination of label picker means including means for supporting a pair of stacks of record labels, the record labels having a central aperture, a picker arm, a pair of vacuum plates mounted on the picker arm, one of the vacuum plates being mounted on the picker arm to permit relative lateral movement therebetween, each vacuum plate having a surface adapted to contact a different one of the pair of stacks of record labels, each vacuum plate being provided with a plurality of vacuum ports communicating with a vacuum system, means for bringing the vacuum plates into engagement with the pair of stacks of record labels to grasp a pair of labels therefrom, and means for automatically aligning the vacuum plates with the corresponding stacks of labels when the vacuum plates are brought into engagement with the stacks of record labels, the automatic aligning means including a centering pin mounted on each vacuum plate adapted to be received in the central apertures of the corresponding stack of labels.

20. In apparatus for producing phonograph records including an extruder having a nozzle for delivering a plastic molding material and at least one record molding apparatus, the combination of
- means for grasping a pair of record labels from a pair of stacks of labels,
- means for activating the extruder to extrude a charge of molding material,
- means for transferring the charge of molding material and the pair of labels to the corresponding molding apparatus,
- means for activating the corresponding molding apparatus to produce a phonograph record having the pair of labels affixed to opposite sides thereof,
- means for trimming the periphery of the phonograph record to produce a finished phonograph record, and
- means for conveying the phonograph record from the molding apparatus to the trimming means, the conveying means providing the entire support for the phonograph record while the trimming means removes the flash at the periphery of the phonograph record.

21. Apparatus for producing phonograph records for use with a record molding apparatus having two opposed molds in spaced relation to each other and including means for bringing into engagement and separating the two molds, means for introducing a plastic molding material between the two molds, and means for activating the molding apparatus to produce a phonograph record, comprising
- means for trimming the periphery of the phonograph record to produce a finished phonograph record, and
- means for conveying the phonograph record from the molding apparatus to the trimming means, the conveying means providing the entire support for the phonograph record while the trimming means removes the flash at the periphery of the phonograph record.

22. Apparatus for producing phonograph records for use with a record molding apparatus having two opposed molds in spaced relation to each other and including means for bringing into engagement and separating the two molds, means for introducing a plastic molding material between the two molds, and means for activating the molding apparatus to produce a phonograph record having flash at the periphery thereof, comprising
- means for trimming the periphery of the phonograph record to produce a finished phonograph record, and
- means for conveying the phonograph record from the molding apparatus to the trimming means, the conveying means including means for grasping the phonograph record inwardly of the flash in the molding apparatus, the conveying means being adapted to support the phonograph record with the grasping means while the trimming means removes the flash at the periphery of the phonograph record.

23. Apparatus according to claim 21, wherein the conveying means includes a conveyor arm, and a vacuum plate rotatably mounted on the conveyor arm, the vacuum plate being provided with a plurality of vacuum ports communicating with a vacuum system, and the trimming means includes means for removing the flash at the periphery of the phonograph record, and means for rotating the phonograph record so as to drive the flash into the removing means.

24. Apparatus according to claim 23, wherein the removing means includes a cutting wheel and the rotating means includes a drive wheel, the cutting wheel and the drive wheel being operatively associated to drive the flash therebetween.

25. A method of producing phonograph records comprising the steps of
- introducing a plastic molding material between the two molds of a record molding apparatus,
- activating the molding apparatus to produce a phonograph record having flash at the periphery thereof,
- extracting the phonograph record from the molding apparatus with conveying means by grasping the phonograph record inwardly of the flash,
- conveying the phonograph record from the molding apparatus to a trimmer, and
- simultaneously supporting the phonograph record entirely by the conveying means and removing the flash at the periphery of the phonograph record with the trimmer.

26. A method of producing phonograph records, comprising the steps of
- feeding a pair of record labels into molding-material-receiving relationship with an extruder,
- extruding a charge of molding material between the pair of labels,
- transferring the charge of molding material and the pair of labels from the extruder to a record molding apparatus, and
- activating the molding apparatus to produce a phonograph record having the pair of labels affixed to opposite sides thereof.

No references cited.

ROBERT F. WHITE, Primary Examiner

K. J. HOVET, Assistant Examiner

U.S. Cl. X.R.

18—5.3, 30; 264—90, 264

UNITED STATES PATENT OFFICE
CERTIFICATE OF CORRECTION

Patent No. 3,526,690        Dated September 1, 1970

Inventor(s) William S. Bachman

It is certified that error appears in the above-identified patent and that said Letters Patent are hereby corrected as shown below:

Column 1, lines 19, 27 and 53, "photograph" should read -- phonograph --. Column 2, line 21, "photograph" should read -- phonograph --. Column 6, line 21, "A pair of chambers 113 (FIG. 8)" and insert -- However, some lateral play is permitted --; line 33, "motors" should read -- motor --; line 55, "vaccum" should read -- vacuum --. Column 8, line 72, "martix" should read -- matrix --. Column 9, line 4, "conduit" should read -- conduits --; line 71, after "unloader" insert -- arm --. Column 10, line 8, "thet" should read -- The --; line 23, after "and" insert -- a --; line 42, "288$^b$" should read -- 286$^b$ --. Column 12, line 6, "contcat" should read -- contact --; line 13, "to" should read -- by --; line 60, "apparaent" should read -- apparent --. Column 16, line 41, "ot" should read -- to --. Column 17, line 32, "photograph" should read -- phonograph --; line 62, "arms" should read -- arm --.

Signed and sealed this 6th day of April 1971.

(SEAL)
Attest:

EDWARD M. FLETCHER, JR.              WILLIAM E. SCHUYLER, JR.
Attesting Officer                     Commissioner of Patents